(12) United States Patent
Wang et al.

(10) Patent No.: US 12,252,031 B2
(45) Date of Patent: Mar. 18, 2025

(54) BATTERY SWAP AUTHENTICATION METHOD AND APPARATUS, ELECTRONIC DEVICE, BATTERY SWAP STATION, AND ELECTRICAL APPARATUS

(71) Applicant: CONTEMPORARY AMPEREX TECHNOLOGY (HONG KONG) LIMITED, Hong Kong (CN)

(72) Inventors: Chao Wang, Ningde (CN); Chunshu Lan, Ningde (CN); Jihai Xie, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 327 days.

(21) Appl. No.: 17/930,276

(22) Filed: Sep. 7, 2022

(65) Prior Publication Data

US 2023/0219454 A1    Jul. 13, 2023

Related U.S. Application Data

(63) Continuation of application No. PCT/CN2022/091473, filed on May 7, 2022.

(30) Foreign Application Priority Data

Jan. 7, 2022  (CN) .......................... 202210019176.6

(51) Int. Cl.
*B60L 53/80*    (2019.01)
*B60L 53/66*    (2019.01)

(52) U.S. Cl.
CPC .............. *B60L 53/80* (2019.02); *B60L 53/66* (2019.02)

(58) Field of Classification Search
None
See application file for complete search history.

(56) References Cited

U.S. PATENT DOCUMENTS

2003/0209375 A1* 11/2003 Suzuki ................... B60L 58/25
                                                                180/68.5
2010/0094496 A1* 4/2010 Hershkovitz .......... B60L 50/66
                                                                701/22
(Continued)

FOREIGN PATENT DOCUMENTS

CN     102045340 A    5/2011
CN     111942211 A    11/2020
(Continued)

OTHER PUBLICATIONS

Written Opinion of International Searching Authority for PCT application No. PCT/CN2022/091473, dated Oct. 11, 2022.
(Continued)

*Primary Examiner* — David V Henze-Gongola
(74) *Attorney, Agent, or Firm* — Ladas & Parry LLP

(57) ABSTRACT

This application provides a battery swap method, a battery swap station, and an electrical apparatus. The battery swap method includes: obtaining identity information of an electrical apparatus which requests a swap of a battery; authenticating the identity information; establishing communication with the electrical apparatus in response to a determination that the identity information passes the authentication; determining whether the battery in the electrical apparatus and a shared battery in the battery swap station satisfy a battery swap condition; and swapping the battery in the electrical apparatus with the shared battery in the battery swap station in response to a determination that at least one of the battery in the electrical apparatus and the shared battery in the battery swap station satisfies the battery swap condition. The batteries are authenticated in addition to
(Continued)

authentication of the electrical apparatus, thereby improving reliability and security of authentication during a battery swap.

19 Claims, 9 Drawing Sheets

(56) References Cited

U.S. PATENT DOCUMENTS

| | | | | |
|---|---|---|---|---|
| 2019/0207397 | A1* | 7/2019 | Lai | B60L 53/68 |
| 2021/0296714 | A1 | 9/2021 | Yamashita et al. | |
| 2022/0036330 | A1* | 2/2022 | Ong | G06Q 30/0645 |

FOREIGN PATENT DOCUMENTS

| | | | |
|---|---|---|---|
| CN | 112550055 | A | 3/2021 |
| CN | 113415208 | A | 9/2021 |
| CN | 113543070 | A | 10/2021 |
| EP | 3708402 | A1 | 9/2020 |
| EP | 3929028 | A1 | 12/2021 |
| JP | 2018161006 | A | 6/2018 |
| JP | 2021078175 | A | 5/2021 |
| JP | 2021128933 | A | 9/2021 |
| JP | 2022540552 | A | 9/2022 |
| JP | 2023548246 | A | 11/2023 |
| WO | 2020090304 | A1 | 5/2020 |
| WO | 2020260623 | A1 | 12/2020 |
| WO | 2021149488 | A1 | 7/2021 |

OTHER PUBLICATIONS

Extended European Search Report for EP application No. 22747922.7, dated Nov. 28, 2023.
Observation by third party for EP application No. 22747922.7, dated Feb. 6, 2024.
Decision to Grant a Patent for JP application No. 2022-548986, dated Apr. 2, 2024.
International Search Report of Application No. PCT/CN2022/091473, mailed Oct. 11, 2022, 5 pages.

* cited by examiner

BATTERY SWAP AUTHENTICATION METHOD AND APPARATUS, ELECTRONIC DEVICE, BATTERY SWAP STATION, AND ELECTRICAL APPARATUS

CROSS-REFERENCE TO RELATED APPLICATIONS

This application is a continuation of International Patent Application No. PCT/CN2022/091473, filed on May 7, 2022, which claims priority to Chinese Patent Application No. 202210019176.6, filed on Jan. 7, 2022. The aforementioned patent applications are incorporated herein by reference in their entirety.

TECHNICAL FIELD

Embodiments of this application relate to the technical field of batteries, and in particular, to a battery swap authentication method and apparatus, an electronic device, a battery swap station, an electrical apparatus, a computer-readable storage medium, and a computer program product.

BACKGROUND

With the rapid development of new energy vehicles, sales of electric vehicles keep growing across the globe. Battery swap stations for replacing a battery for an electric vehicle are widely used to overcome limitations on durability and charging duration of a power battery.

In some circumstances, a vehicle identification number (VIN) of the vehicle needs to be authenticated before a battery swap operation is performed at a battery swap station. The battery swap operation is performed on condition that the authentication succeeds.

However, the authentication method in the foregoing circumstances is not secure.

SUMMARY

This application aims to solve at least one of technical problems in the related art. In view of this, one objective of this application is to disclose a battery swap authentication method and apparatus, an electronic device, a battery swap station, an electrical apparatus, a computer-readable storage medium, and a computer program product to improve security of authentication during a battery swap.

An embodiment of a first aspect of this application provides a battery swap authentication method, applied to a battery swap station. The method includes: obtaining identity information of an electrical apparatus; authenticating the identity information; establishing communication with the electrical apparatus in response to a result of determining that the identity information passes the authentication; and performing a battery swap operation in response to a result of determining that an energy storage battery in the electrical apparatus and/or a shared battery in the battery swap station satisfies a battery swap rule.

In the battery swap authentication method according to this embodiment of this application, the energy storage battery in the electrical apparatus and/or the shared battery in the battery swap station is authenticated in addition to authentication of the identity information of the electrical apparatus, thereby improving reliability and security of authentication during a battery swap.

In some embodiments, after the establishing communication with the electrical apparatus, the method further includes: receiving first information of the energy storage battery sent by the electrical apparatus; and authenticating the first information. The performing a battery swap operation in response to a result of determining that an energy storage battery in the electrical apparatus and/or a shared battery in the battery swap station satisfies a battery swap rule includes: sending an authentication success message of the first information to the electrical apparatus in response to a result of determining that the first information passes the authentication, and performing the battery swap operation. In this way, it is ensured that the energy storage battery as a replacement to the battery swap station is a superior-quality battery, thereby improving reliability and security of authentication during a battery swap, avoiding substandard replacements, and further improving durability and security of other electrical apparatuses that subsequently use the energy storage battery.

In some embodiments, the sending an authentication success message of the first information to the electrical apparatus in response to a result of determining that the first information passes the authentication, and performing a battery swap operation, include: sending second information of the shared battery to the electrical apparatus in response to a result of determining that the first information passes the authentication; and performing the battery swap operation in response to a result of determining that an authentication success message of the second information is received from the electrical apparatus. This method authenticates not only the identity of the electrical apparatus, but also the shared battery and the energy storage battery, thereby not only ensuring that the energy storage battery as a replacement to the battery swap station is superior in quality, but also ensuring that the shared battery as a replacement to the electrical apparatus is superior in quality, and further improving security and reliability of authentication during a battery swap.

In some embodiments, before the receiving first information of the energy storage battery sent by the electrical apparatus, the method further includes: sending third information of the battery swap station to the electrical apparatus. The receiving first information of the energy storage battery sent by the electrical apparatus, and authenticating the first information, include: authenticating the first information in response to a result of determining that the first information of the energy storage battery is received from the electrical apparatus. By adding a process of the electrical apparatus authenticating the third information of the battery swap station, it can be determined that the battery swap station performing the battery swap operation is qualified or licensed, thereby further improving security and reliability of battery swapping. By using the first information as an authentication success message of the third information, the number of interactions between the battery swap station and the electrical apparatus is reduced, and the efficiency of battery swap authentication is improved.

In some embodiments, after the establishing communication with the electrical apparatus, the method further includes: sending second information of the shared battery to the electrical apparatus. The performing a battery swap operation in response to a result of determining that an energy storage battery in the electrical apparatus and/or a shared battery in the battery swap station satisfies a battery swap rule includes: performing the battery swap operation in response to a result of determining that an authentication success message of the second information is received from the electrical apparatus. In this method, after authenticating the identity information of the electrical apparatus, the battery swap station still needs to send the second information of the shared battery to the electrical apparatus for authentication, and performs the battery swap operation on condition that the authentication success message of the second information is received, thereby ensuring that the shared battery as a replacement to the electrical apparatus is superior in quality, improving reliability and security of authentication during a battery swap, and avoiding substandard replacements.

In some embodiments, the performing the battery swap operation in response to a result of determining that an authentication success message of the second information is received from the electrical apparatus includes: authenticating first information in response to a result of determining that the first information of the energy storage battery is received from the electrical apparatus; and sending an authentication success message of the first information to the electrical apparatus in response to a result of determining that the first information passes the authentication, and performing the battery swap operation. This method authenticates not only the identity of the electrical apparatus, but also the shared battery and the energy storage battery, thereby not only ensuring that the energy storage battery as a replacement to the battery swap station is superior in quality, but also ensuring that the shared battery as a replacement to the electrical apparatus is superior in quality, and further improving security and reliability of authentication during a battery swap.

In some embodiments, after the establishing communication with the electrical apparatus, the method further includes: sending third information of the battery swap station to the electrical apparatus; and sending the second information of the shared battery to the electrical apparatus in response to a result of determining that an authentication success message of the third information is received from the electrical apparatus. By adding a process of the electrical apparatus authenticating the third information of the battery swap station, it can be determined that the battery swap station performing the battery swap operation is qualified or licensed, thereby further improving security and reliability of battery swapping.

In some embodiments, the authenticating the identity information includes: finding a media access control (MAC) address of the electrical apparatus based on a correspondence between the identity information and the MAC address, where the identity information includes marker information of the electrical apparatus. The establishing communication with the electrical apparatus in response to a result of determining that the identity information passes the authentication includes: establishing communication with the electrical apparatus by use of the MAC address of the electrical apparatus in response to a result of determining that the MAC address of the electrical apparatus is found in the correspondence between the identity information and the MAC address. By using the marker information as the identity information of the electrical apparatus, the difficulty of obtaining the identity information can be reduced. In addition, whether the MAC address of the electrical apparatus is found is used as a condition for determining whether the identity information is successfully authenticated, thereby not only authenticating the identity of the electrical apparatus, but also facilitating the establishment of communication with the electrical apparatus. In addition, compared with the VIN in the related art, the MAC address is more difficult to obtain, and is more confidential. The MAC address used for authentication can also improve security.

In some embodiments, the first information includes: first identification information and first encrypted information. The first encrypted information is generated by encrypting the first identification information by use of a private key, and the private key is stored in production equipment of the energy storage battery. The authenticating the first information includes: decrypting the first encrypted information by use of a public key corresponding to the private key to generate first decrypted information, where the public key is stored in the battery swap station; and comparing the first decrypted information with the first identification information. The determining that the first information passes the authentication includes: determining that the first decrypted information is identical to the first identification information. By encrypting the first information, the security and reliability of authentication during a battery swap can be improved. In addition, because the private key is stored only in the production equipment and is more confidential, the security of authentication during the battery swap is further improved.

In some embodiments, the second information includes: second identification information and second encrypted information. The second encrypted information is generated by encrypting the second identification information by use of a private key, and the private key is stored in production equipment of the shared battery. By encrypting the second information, the safety and reliability of authentication during a battery swap can be improved. In addition, because the private key is stored only in the production equipment and is more confidential, the security of authentication during the battery swap is further improved.

In some embodiments, the third information includes: third identification information and third encrypted information. The third encrypted information is generated by encrypting the third identification information by use of a private key, and the private key is stored in production equipment of the battery swap station. By encrypting the third information, the security and reliability of authentication during a battery swap can be improved. In addition, because the private key is stored only in the production equipment and is more confidential, the security of authentication during the battery swap is further improved.

An embodiment of a second aspect of this application provides a battery swap authentication method, applied to an electrical apparatus and including: establishing communication with a battery swap station in response to a result of determining that an authentication success message of identity information of the electrical apparatus is received from the battery swap station; and coordinating with the battery swap station to perform a battery swap operation in response to a result of determining that an energy storage battery in the electrical apparatus and/or a shared battery in the battery swap station satisfies a battery swap rule.

In some embodiments, after the establishing communication with a battery swap station, the method further includes: sending first information of the energy storage battery to the battery swap station. The coordinating with the battery swap station to perform a battery swap operation in response to a result of determining that an energy storage battery in the electrical apparatus and/or a shared battery in the battery swap station satisfies a battery swap rule includes: coordinating with the battery swap station to perform the battery swap operation in response to a result of determining that an authentication success message of the first information is received from the battery swap station.

In some embodiments, the coordinating with the battery swap station to perform the battery swap operation in response to a result of determining that an authentication success message of the first information is received from the battery swap station includes: authenticating second information in response to a result of determining that the second information of the shared battery is received from the battery swap station; and sending an authentication success message of the second information to the battery swap station in response to a result of determining that the second information passes the authentication, and coordinating with the battery swap station to perform the battery swap operation.

In some embodiments, after the establishing communication with a battery swap station, the method further includes: receiving third information of the battery swap station sent by the battery swap station; authenticating the third information; and sending the first information of the energy storage battery to the battery swap station in response to a result of determining that the third information passes the authentication.

In some embodiments, after the establishing communication with a battery swap station, the method further includes: receiving second information of the shared battery sent by the battery swap station; and authenticating the second information. The coordinating with the battery swap station to perform a battery swap operation in response to a result of determining that an energy storage battery in the electrical apparatus and/or a shared battery in the battery swap station satisfies a battery swap rule includes: sending an authentication success message of the second information to the electrical apparatus in response to a result of determining that the second information passes the authentication, and coordinating with the battery swap station to perform the battery swap operation.

In some embodiments, the sending an authentication success message of the second information to the electrical apparatus in response to a result of determining that the second information passes the authentication, and coordinating with the battery swap station to perform a battery swap operation, include: sending the first information of the energy storage battery to the battery swap station in response to a result of determining that the second information passes the authentication; and coordinating with the battery swap station to perform the battery swap operation in response to a result of determining that an authentication success message of the first information is received from the battery swap station.

In some embodiments, after the establishing communication with the battery swap station, the method further includes: receiving third information of the battery swap station sent by the battery swap station; authenticating the third information; and sending an authentication success message of the third information to the battery swap station in response to a result of determining that the third information passes the authentication, and receiving the second information of the shared battery sent by the battery swap station.

In some embodiments, the establishing communication with a battery swap station in response to a result of determining that an authentication success message of identity information is received from the battery swap station includes: establishing communication with the battery swap station in response to a result of determining that a communication request sent by the battery swap station by use of a MAC address of the electrical apparatus is received, where the MAC address of the electrical apparatus corresponds to the identity information of the electrical apparatus, and the identity information includes marker information of the electrical apparatus.

In some embodiments, the first information includes: first identification information and first encrypted information. The first encrypted information is generated by encrypting the first identification information by use of a private key, and the private key is stored in production equipment of the energy storage battery.

In some embodiments, the second information includes: second identification information and second encrypted information. The second encrypted information is generated by encrypting the second identification information by use of a private key, and the private key is stored in production equipment of the shared battery. The authenticating the second information includes: decrypting the second encrypted information by use of a public key corresponding to the private key to generate second decrypted information, where the public key is stored in the electrical apparatus; and comparing the second decrypted information with the second identification information. The determining that the second information passes the authentication includes: determining that the second decrypted information is identical to the second identification information.

In some embodiments, the third information includes: third identification information and third encrypted information. The third encrypted information is generated by encrypting the third identification information by use of a private key, and the private key is stored in production equipment of the battery swap station. The authenticating the third information includes: decrypting the third encrypted information by use of a public key corresponding to the private key to generate third decrypted information, where the public key is stored in the electrical apparatus; and comparing the third decrypted information with the third identification information. The determining that the third information passes the authentication includes: determining that the third decrypted information is identical to the third identification information.

An embodiment of a third aspect of this application provides a battery swap authentication apparatus, applied to a battery swap station and including: an obtaining unit, configured to obtain identity information of an electrical apparatus; a first battery swap station authentication unit, configured to authenticate the identity information; a battery swap station communication establishing unit, configured to establish communication with the electrical apparatus in response to a result of determining that the identity information passes the authentication; and a battery swap control unit, configured to perform a battery swap operation in response to a result of determining that an energy storage battery in the electrical apparatus and/or a shared battery in the battery swap station satisfies a battery swap rule.

In some embodiments, the battery swap control unit is further configured to receive first information of the energy storage battery sent by the electrical apparatus; authenticate the first information; and send an authentication success message of the first information to the electrical apparatus in response to a result of determining that the first information passes the authentication, and perform the battery swap operation.

In some embodiments, the battery swap control unit is further configured to send second information of the shared battery to the electrical apparatus in response to a result of determining that the first information passes the authentication; and perform the battery swap operation in response to a result of determining that an authentication success message of the second information is received from the electrical apparatus.

In some embodiments, the battery swap control unit is further configured to send third information of the battery swap station to the electrical apparatus; and authenticate first information in response to a result of determining that the first information of the energy storage battery is received from the electrical apparatus.

In some embodiments, the battery swap control unit is further configured to send second information of the shared battery to the electrical apparatus; and perform the battery swap operation in response to a result of determining that an authentication success message of the second information is received from the electrical apparatus.

In some embodiments, the battery swap control unit is further configured to authenticate the first information in response to a result of determining that the first information of the energy storage battery is received from the electrical apparatus; and send an authentication success message of the first information to the electrical apparatus in response to a result of determining that the first information passes the authentication, and perform the battery swap operation.

In some embodiments, the battery swap control unit is further configured to send third information of the battery swap station to the electrical apparatus; and send the second information of the shared battery to the electrical apparatus in response to a result of determining that an authentication success message of the third information is received from the electrical apparatus.

In some embodiments, the first battery swap station authentication unit is further configured to find a MAC address of the electrical apparatus based on a correspondence between the identity information and the MAC address, where the identity information includes marker information of the electrical apparatus. The battery swap station communication establishing unit is further configured to establish communication with the electrical apparatus by use of the MAC address of the electrical apparatus in response to a result of determining that the MAC address of the electrical apparatus is found in the correspondence between the identity information and the MAC address.

In some embodiments, the first information includes: first identification information and first encrypted information. The first encrypted information is generated by encrypting the first identification information by use of a private key, and the private key is stored in production equipment of the energy storage battery. The battery swap control unit is further configured to decrypt the first encrypted information by use of a public key corresponding to the private key to generate first decrypted information, where the public key is stored in the battery swap station; and compare the first decrypted information with the first identification information. The determining that the first information passes the authentication includes: determining that the first decrypted information is identical to the first identification information.

In some embodiments, the second information includes: second identification information and second encrypted information. The second encrypted information is generated by encrypting the second identification information by use of a private key, and the private key is stored in production equipment of the shared battery.

In some embodiments, the third information includes: third identification information and third encrypted information. The third encrypted information is generated by encrypting the third identification information by use of a private key, and the private key is stored in production equipment of the battery swap station.

An embodiment of a fourth aspect of this application provides a battery swap authentication apparatus, applied to an electrical apparatus and including: an electrical apparatus communication establishing unit, configured to establish communication with a battery swap station in response to a result of determining that an authentication success message of identity information of the electrical apparatus is received from the battery swap station; and an electrical apparatus coordinating unit, configured to coordinate with the battery swap station to perform a battery swap operation in response to a result of determining that an energy storage battery in the electrical apparatus and/or a shared battery in the battery swap station satisfies a battery swap rule.

In some embodiments, the electrical apparatus coordinating unit is further configured to send first information of the energy storage battery to the battery swap station; and coordinate with the battery swap station to perform the battery swap operation in response to a result of determining that an authentication success message of the first information is received from the battery swap station.

In some embodiments, the electrical apparatus coordinating unit is further configured to authenticate second information in response to a result of determining that the second information of the shared battery is received from the battery swap station; and send an authentication success message of the second information to the battery swap station in response to a result of determining that the second information passes the authentication, and coordinate with the battery swap station to perform the battery swap operation.

In some embodiments, the electrical apparatus coordinating unit is further configured to receive third information of the battery swap station sent by the battery swap station; authenticate the third information; and send the first information of the energy storage battery to the battery swap station in response to a result of determining that the third information passes the authentication.

In some embodiments, the electrical apparatus coordinating unit is further configured to receive second information of the shared battery sent by the battery swap station; authenticate the second information; and send an authentication success message of the second information to the electrical apparatus in response to a result of determining that the second information passes the authentication, and coordinate with the battery swap station to perform the battery swap operation.

In some embodiments, the electrical apparatus coordinating unit is further configured to send first information of the energy storage battery to the battery swap station in response to a result of determining that the second information passes the authentication; and coordinate with the battery swap station to perform the battery swap operation in response to a result of determining that an authentication success message of the first information is received from the battery swap station.

In some embodiments, the electrical apparatus coordinating unit is further configured to receive third information of the battery swap station sent by the battery swap station; authenticate the third information; and send an authentication success message of the third information to the battery swap station in response to a result of determining that the third information passes the authentication, and receive the second information of the shared battery sent by the battery swap station.

In some embodiments, the electrical apparatus communication establishing unit is further configured to establish communication with the battery swap station in response to a result of determining that a communication request sent by the battery swap station by use of a MAC address of the electrical apparatus is received, where the MAC address of the electrical apparatus corresponds to the identity information of the electrical apparatus, and the identity information includes marker information of the electrical apparatus.

In some embodiments, the first information includes: first identification information and first encrypted information. The first encrypted information is generated by encrypting the first identification information by use of a private key, and the private key is stored in production equipment of the energy storage battery.

In some embodiments, the second information includes: second identification information and second encrypted information. The second encrypted information is generated by encrypting the second identification information by use of a private key, and the private key is stored in production equipment of the shared battery. The electrical apparatus coordinating unit is further configured to decrypt the second encrypted information by use of a public key corresponding to the private key to generate second decrypted information, where the public key is stored in the electrical apparatus; and compare the second decrypted information with the second identification information. The determining that the second information passes the authentication includes: determining that the second decrypted information is identical to the second identification information.

In some embodiments, the third information includes: third identification information and third encrypted information. The third encrypted information is generated by encrypting the third identification information by use of a private key, and the private key is stored in production equipment of the battery swap station. The electrical apparatus coordinating unit is further configured to decrypt the third encrypted information by use of a public key corresponding to the private key to generate third decrypted information, where the public key is stored in the electrical apparatus; and compare the third decrypted information with the third identification information. The determining that the third information passes the authentication includes: determining that the third decrypted information is identical to the third identification information.

An embodiment of a fifth aspect of this application provides an electronic device, including: at least one processor; and a memory connected in communication to the at least one processor. The memory stores an instruction executable by the at least one processor. The instruction is executed by the at least one processor so that the at least one processor is enabled to perform the method according to the first aspect.

An embodiment of a sixth aspect of this application provides a battery swap station, including the electronic device according to the fifth aspect.

An embodiment of a seventh aspect of this application provides an electronic device, including: at least one processor; and a memory connected in communication to the at least one processor. The memory stores an instruction executable by the at least one processor. The instruction is executed by the at least one processor so that the at least one processor is enabled to perform the method according to the second aspect.

An embodiment of an eighth aspect of this application provides an electrical apparatus, including the electronic device according to the seventh aspect.

In some embodiments, the electrical apparatus includes a vehicle.

An embodiment of a ninth aspect of this application provides a computer-readable storage medium that stores a computer instruction, where the computer instruction is used to enable a computer to perform the method disclosed above.

An embodiment of a tenth aspect of this application provides a computer program product, including a computer program. When executed by a processor, the computer program implements the method disclosed above.

The foregoing description is merely an overview of the technical solutions of this application. The following expounds specific embodiments of this application to enable a clearer understanding of the technical solutions of this application, enable implementation based on the content of the specification, and make the foregoing and other objectives, features, and advantages of this application more evident and comprehensible.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

DETAILED DESCRIPTION

Figure 1:
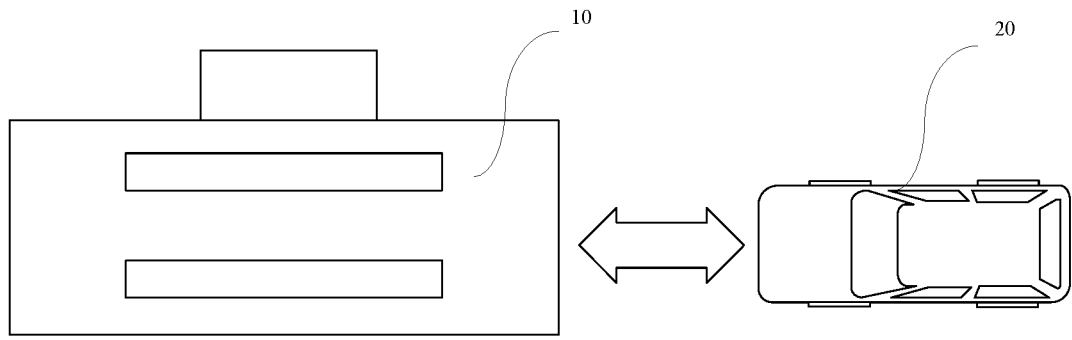
FIG. 1 is a schematic diagram of an application scenario of a battery swap authentication method according to some embodiments of this application.

Embodiments of the technical solutions of this application are described in detail below with reference to the drawings. The following embodiments are merely intended to describe the technical solutions of this application more clearly, and are merely exemplary but without hereby limiting the protection scope of this application.

Unless otherwise defined, all technical and scientific terms used herein have the same meanings as usually understood by a person skilled in the technical field of this application. The terms used herein are merely intended for describing specific embodiments but are not intended to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish different objects but not intended to indicate or imply relative importance or implicitly specify the number of the indicated technical features, the specific order, or order of priority. In the description of the embodiments of this application, unless otherwise expressly specified, "a plurality of" means two or more.

Reference to "embodiment" herein means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of embodiments of this application, unless otherwise expressly specified and qualified, the technical terms such as "mounting", "concatenation", "connection", and "fixing" need to be understood in a broad sense, for example, understood as a fixed connection or a detachable connection or understood as being integrated into a whole; or understood be as a mechanical connection or an electrical connection, a direct connection or an indirect connection implemented through an intermediary; or understood as interior communication between two components or interaction between two components. A person of ordinary skill in the art understands the specific meanings of the terms in the embodiments of this application according to the context.

With the rapid development of new energy vehicles, sales of electric vehicles keep growing across the globe. Battery swap stations for replacing a battery for an electric vehicle are widely used to overcome limitations on durability and charging duration of a power battery. A battery swap station may be stored with shared batteries. When being about to be depleted of energy, an energy storage battery (that is, in-vehicle battery) of an electric vehicle can be exchanged with a shared battery in the battery swap station to replenish the electric vehicle with electrical energy to enable continuous running.

In the related art, a VIN of the vehicle needs to be authenticated before a battery swap operation is performed at the battery swap station. The battery swap operation is performed on condition that the authentication succeeds.

However, such an authentication method merely authenticates the vehicle. If the energy storage battery of the vehicle is an aftermarket inferior battery, the inferior battery may be swapped for the superior battery in the battery swap station. The swapped inferior battery is used as a replacement to another electric vehicle through a battery swap operation to impair the endurance mileage of other electric vehicles, and even pose a safety hazard. For another example, if a shared battery in the battery swap station is an aftermarket inferior battery, the inferior battery may be used as a replacement to a vehicle to impair the endurance mileage of the vehicle, or even pose a safety hazard. Therefore, the battery swap authentication method in the related art is not reliable or secure.

To solve at least one of the foregoing problems, embodiments of this application provide a battery swap authentication method and apparatus, an electronic device, a battery swap station, and an electrical apparatus. The energy storage battery in the electrical apparatus and/or the shared battery in the battery swap station is authenticated in addition to authentication of the identity information of the electrical apparatus, thereby improving reliability and security of authentication during a battery swap.

In some embodiments, the electrical apparatus includes, but is not limited to a vehicle, an energy storage station, or the like.

FIG. 1 is a schematic diagram of an application scenario of a battery swap authentication method according to some embodiments of this application. Referring to FIG. 1, the battery swap authentication method disclosed herein is applicable to a process of battery swapping between the battery swap station 10 and the electrical apparatus 20.

The electrical apparatus 20 may be an electric vehicle shown in FIG. 1. The electric vehicle is equipped with an energy storage battery (also referred to as an in-vehicle battery). The electrical apparatus 20 may instead be an energy storage station in which an energy storage battery is deployed. When the electrical apparatus 20 is an electric vehicle, the energy storage battery can provide electrical energy for the electric vehicle to enable normal running. The energy storage battery may be any type of battery, including but not limited to: lithium-ion battery, lithium metal battery, lithium sulfur battery, lead acid battery, nickel-cadmium battery, nickel-hydrogen battery, lithium-air battery, or the like. In terms of the scale of the energy storage battery, the energy storage battery in embodiments of this application may be a battery cell (or briefly known as a cell), or a battery module or battery pack. The battery module or battery pack may be formed by connecting a plurality of batteries in series and parallel. In embodiments of this application, the specific type and scale of the energy storage battery are not specifically limited.

The battery swap station 10 may be stored with a plurality of shared batteries. The battery swap station 10 is able to charge the shared batteries. Understandably, the battery swap station 10 may be stored with shared batteries of different models. When the electrical apparatus 20 is a vehicle, the shared batteries of different models are adaptable to vehicles of different models. When the electrical apparatus 20 is an energy storage station, the shared batteries of different models are adaptable to energy storage stations of different models. The shared batteries in the battery swap station 10 include, but are not limited to, lithium-ion battery, lithium metal battery, lithium sulfur battery, lead acid battery, nickel-cadmium battery, nickel-hydrogen battery, lithium-air battery, or the like. In terms of the scale of the shared batteries, each shared battery may be a battery cell (or briefly known as a cell), or a battery module or battery pack. The battery module or battery pack may be formed by connecting a plurality of batteries in series and parallel.

During battery swapping, the battery swap station may select, as a replacement, a shared battery that is consistent with the model of the energy storage battery to be replaced and that remains at a sufficient state of charge (SOC). Sufficient SOC may mean that a percentage of available SOC is greater than or equal to a preset value that is 90%, 100%, or the like. Specifically, the preset value may be set according to the actual situation.

Using a vehicle as an example of the electrical apparatus 20, when the SOC of the energy storage battery is insufficient, the driver may drive the vehicle into the battery swap station 10. After the battery swap authentication succeeds, the battery swap station 10 can perform a battery swap operation for the vehicle, that is, swap the energy storage battery with a qualified shared battery. In the following embodiments, for ease of explaining the solution of this application, the shared battery merely represents a qualified battery in the battery swap station.

Figure 2:
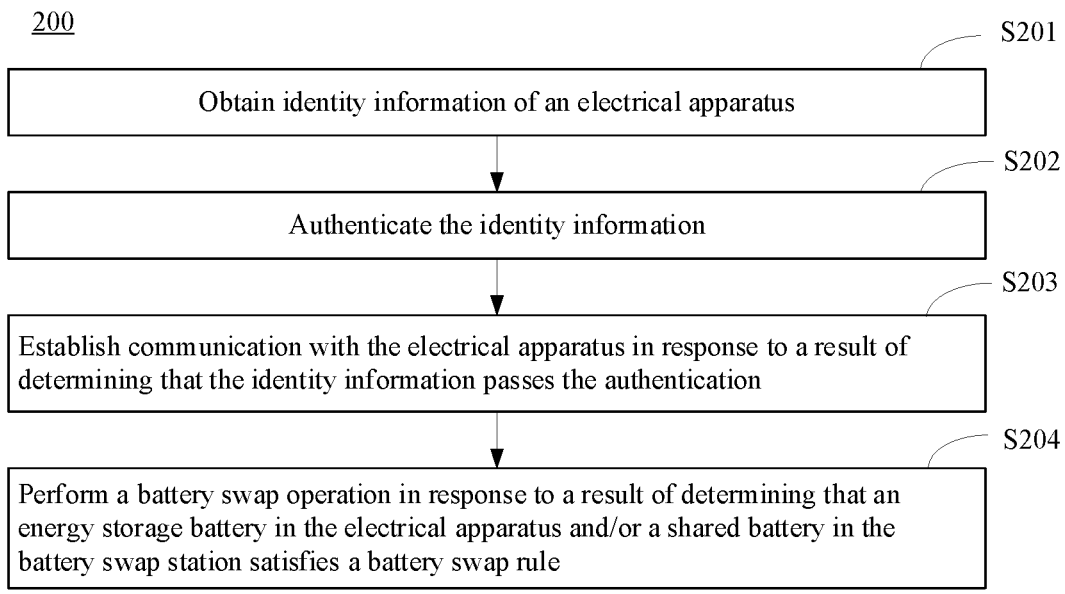
FIG. 2 is a flowchart of a battery swap authentication method according to some embodiments of this application.

FIG. 2 is a flowchart of a battery swap authentication method according to some embodiments of this application. Referring to FIG. 2, an embodiment of this application provides a battery swap authentication method 200, applied to a battery swap station 10. The method 200 includes the following steps S201 to S204.

Step S201: Obtain identity information of an electrical apparatus 20.
Step S202: Authenticate the identity information.
Step S203: Establish communication with the electrical apparatus 20 in response to a result of determining that the identity information passes the authentication.
Step S204: Perform a battery swap operation in response to a result of determining that an energy storage battery in the electrical apparatus 20 and/or a shared battery in the battery swap station 10 satisfies a battery swap rule.

In step S201, the identity information of the electrical apparatus 20 may be marker information of the electrical apparatus 20, a model of the electrical apparatus, or the like. In some embodiments, using a vehicle as an example of the electrical apparatus 20, the marker information may be license plate information, vehicle model, or the like. In this embodiment, a camera device may be disposed at the entrance of the battery swap station 10. The camera device may obtain image information including license plate information by photographing or other means. The battery swap station 10 may obtain image information through the camera device, and process the image information to obtain the license plate information of the vehicle.

In step S202, the battery swap station 10 may authenticate the identity information. Understandably, the battery swap station 10 can create a database for electrical apparatuses 20 that can perform a battery swap operation. In some embodiments, the database may store identity information of all electrical apparatuses that can perform the battery swap operation. In step S202, the identity information of the electrical apparatus 20 may be matched with the identity information in the database. If the identity information of the electrical apparatus 20 exists in the database, it is determined that the identity information of the electrical apparatus passes the authentication, that is, the electrical apparatus 20 is a service object of the battery swap station 10. If the identity information of the electrical apparatus 20 does not exist in the database, it is determined that the electrical apparatus 20 is unable to perform the battery swap operation, that is, the electrical apparatus 20 is not a service object of the battery swap station 10. In this case, a fault alarm may be raised to prompt the electrical apparatus 20 to exit the battery swap station 10, or the electrical apparatus 20 is refused access to the battery swap station 10, or the like.

In other embodiments, the database may further store a correspondence between the identity information and a VIN. In step S202, the database may be searched for a VIN corresponding to the identity information of the electrical apparatus 20. If the corresponding VIN is found, it is determined that the identity information of the electrical apparatus 20 passes the authentication. If the corresponding VIN is not found, it is determined that the identity information of the electrical apparatus 20 fails the authentication.

In addition, the database may be stored in the battery swap station, or may be stored in a cloud server, without being specifically limited herein.

In step S203, if the identity information passes the authentication, the battery swap station 10 can establish communication with the electrical apparatus 20. Understandably, communication between the battery swap station 10 and the electrical apparatus 20 may be performed in various ways such as Bluetooth communication, WiFi network communication, Zigbee network communication, or Near Field Communication (NFC).

In step S204, whether an energy storage battery in the electrical apparatus 20 and/or a shared battery in the battery swap station 10 satisfies a battery swap rule may be understood as: whether the energy storage battery and/or shared battery is a superior battery manufactured by a qualified manufacturer, such as an original equipment manufacturer (OEM) battery. The energy storage battery is a battery that is mounted in the electrical apparatus 20 and that remains to be replaced. The shared battery is a battery in the battery swap station 10, consistent with the model of the energy storage battery and remaining at a sufficient SOC. A battery swap operation may include an operation of detaching the energy storage battery from the electrical apparatus 20, and mounting the shared battery to the electrical apparatus 20.

Specifically, after communication is established between the electrical apparatus 20 and the battery swap station 10, it is determined whether the energy storage battery in the electrical apparatus 20 and/or the shared battery in the battery swap station 10 satisfies the battery swap rule. The battery swap operation can be performed on condition that the battery swap rule is satisfied. If the battery swap rule is not satisfied, the electrical apparatus 20 may be prompted to exit the battery swap station 10.

Understandably, in some embodiments, in step S204, that the energy storage battery satisfies the battery swap rule may serve as a condition for performing the battery swap operation. That is, the battery swap operation is performed on condition that the energy storage battery is a superior battery.

In other embodiments, in step S204, that the shared battery satisfies the battery swap rule may serve as a condition for performing the battery swap operation. That is, the battery swap operation is performed on condition that the shared battery is a superior battery.

In other embodiments, in step S204, that both the energy storage battery and the shared battery satisfy the battery swap rule may serve as a condition for performing the battery swap operation. That is, the battery swap operation is performed on condition that both the energy storage battery and the shared battery are superior batteries.

In the battery swap authentication method according to this embodiment, before the battery swap operation is performed, whether the energy storage battery in the electrical apparatus 20 and/or the shared battery in the battery swap station 10 satisfies the battery swap rule is verified in addition to authentication of the identity information of the electrical apparatus. That is, a step of authenticating the batteries is added, thereby improving security and reliability of authentication during a battery swap.

Figure 3:
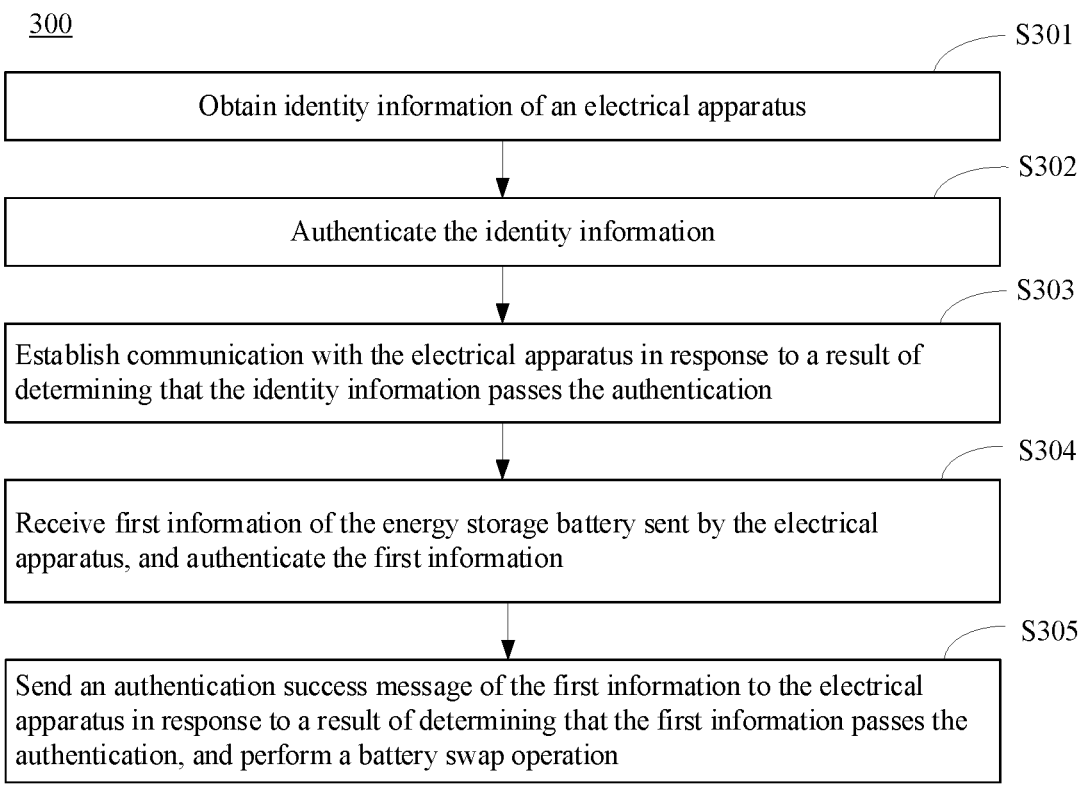
FIG. 3 is a flowchart of a battery swap authentication method according to other embodiments of this application.

FIG. 3 is a flowchart of a battery swap authentication method according to other embodiments of this application. Referring to FIG. 3, an embodiment of this application further provides a battery swap authentication method 300. The method 300 includes the following steps S301 to S305.

Step S301: Obtain identity information of an electrical apparatus 20.

Step S302: Authenticate the identity information.

Step S303: Establish communication with the electrical apparatus 20 in response to a result of determining that the identity information passes the authentication.

Step S304: Receive first information of the energy storage battery sent by the electrical apparatus 20, and authenticate the first information.

Step S305: Send an authentication success message of the first information to the electrical apparatus in response to a result of determining that the first information passes the authentication, and perform a battery swap operation.

Steps S301 to S303 are implemented in the same way as steps S201 to S203 in the foregoing embodiment, details of which can be learned by referring to the foregoing embodiment. This embodiment differs from the embodiment shown in FIG. 2 in that, in this embodiment, step S304 is added after step S303, and step S204 in FIG. 2 is specifically configured to include step S305.

In this embodiment, the first information may be information used to identify the energy storage battery. For example, the first information may be a barcode, serial number, or the like of the energy storage battery. For another example, the first information may be a barcode, serial number, or the like of a component (such as a chip) in the energy storage battery. Understandably, the first information varies between energy storage batteries. That is, the first information can be used to accurately identify an energy storage battery.

In this embodiment, the first information may be authenticated in various ways. For example, using a barcode as an example of the first information, the database of the battery swap station 10 may further store barcodes of all batteries that can perform a battery swap operation. The obtained barcode of the energy storage battery of the electrical apparatus 20 is matched with the barcodes in the database. If the same barcode is matched successfully in the database, it is determined that the first information passes the authentication. If the same barcode is absent in the database, it is determined that the first information fails the authentication, and in this case, a fault alarm may be raised to prompt the electrical apparatus 20 to exit the battery swap station.

In this embodiment, the condition for performing the battery swap operation is that the first information passes the authentication.

Understandably, after the communication is established between the electrical apparatus 20 and the battery swap station 10, the electrical apparatus 20 may send the first information of the energy storage battery to the battery swap station 10 first. Upon receiving the first information, the battery swap station 10 may authenticate the first information. If the first information passes the authentication, the energy storage battery satisfies the battery swap rule. In this case, an authentication success message of the first information may be sent to the electrical apparatus 20, and a battery swap operation may be performed on the energy storage battery.

After receiving the authentication success message of the first information, the electrical apparatus 20 may coordinate with the battery swap station 10 to perform a battery swap operation. For example, when the electrical apparatus 20 is a vehicle, the vehicle may send a prompt message to prompt the driver to take up the battery swap operation, unlock the energy storage battery, power off, or the like.

In this method, after the battery swap station 10 authenticates the identity information of the electrical apparatus 20, the battery swap station 10 further authenticates the first information of the energy storage battery, and performs the battery swap operation after success of the authentication, thereby ensuring that the energy storage battery as a replacement to the battery swap station 10 is superior in quality, improving reliability and security of authentication during the battery swap, avoiding substandard replacements, and further improving safety of other electrical apparatuses that subsequently use this energy storage battery. It needs to be noted that when the electrical apparatus 20 is a vehicle, the durability of the vehicle can be improved.

Figure 4:
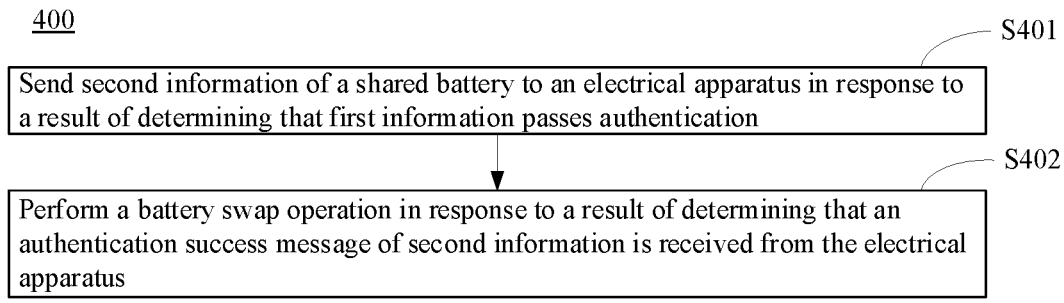
FIG. 4 shows an implementation of step S305 in FIG. 3.

FIG. 4 shows an implementation of step S305 in FIG. 3. Referring to FIG. 4, in some embodiments, step S305 may specifically include step S401 and step S402.

Step S401: Send second information of a shared battery to an electrical apparatus 20 in response to a result of determining that first information passes authentication.

Step S402: Perform a battery swap operation in response to a result of determining that an authentication success message of second information is received from the electrical apparatus 20.

The second information may be information used to identify the shared battery. For example, the second information may be a barcode, serial number, or the like of the shared battery. For another example, the second information may be a barcode, serial number, or the like of a component (such as a chip) in the shared battery. Understandably, the second information varies between shared batteries. That is, the second information can be used to accurately identify a shared battery. Definitely, in some embodiments, the type of the first information may be identical to the type of the second information. For example, both may be a barcode or the like of a battery. In other embodiments, the type of the first information may be different from the type of the second information, and may be set according to the specific situation.

In this embodiment, after the first information passes the authentication, the second information of the shared battery may be sent to the electrical apparatus 20 for authentication. That is, the second information of the shared battery is sent to the electrical apparatus 20 as an authentication success message of the first information. The electrical apparatus 20 may authenticate the second information. If the second information passes the authentication, the electrical apparatus 20 may send an authentication success message of the second information to the battery swap station 10. The battery swap station 10 may perform a battery swap operation after receiving the authentication success message of the second information.

Understandably, in this embodiment, after the battery swap station 10 authenticates the identity information of the electrical apparatus 20, the battery swap station 10 authenticates the first information of the energy storage battery first. After the authentication succeeds, the electrical apparatus 20 authenticates the second information of the shared battery, and performs a battery swap operation after the authentication succeeds.

The electrical apparatus 20 may authenticate the second information in various ways. For example, using a barcode as an example of the second information, a cloud database may store barcodes of all available shared batteries. The received barcode of the shared battery is matched with the barcodes in the cloud database. If the same barcode is matched successfully in the cloud database, it is determined that the second information passes the authentication. If the same barcode is absent in the database, it is determined that the second information fails the authentication, and in this case, a fault alarm may be raised to prompt the electrical apparatus 20 to exit the battery swap station.

This method authenticates not only the identity of the electrical apparatus 20, but also the shared battery and the energy storage battery, thereby not only ensuring that the energy storage battery as a replacement to the battery swap station 10 is superior in quality, but also ensuring that the shared battery as a replacement to the electrical apparatus 20 is superior in quality, and further improving security and reliability of authentication during a battery swap.

Figure 5:
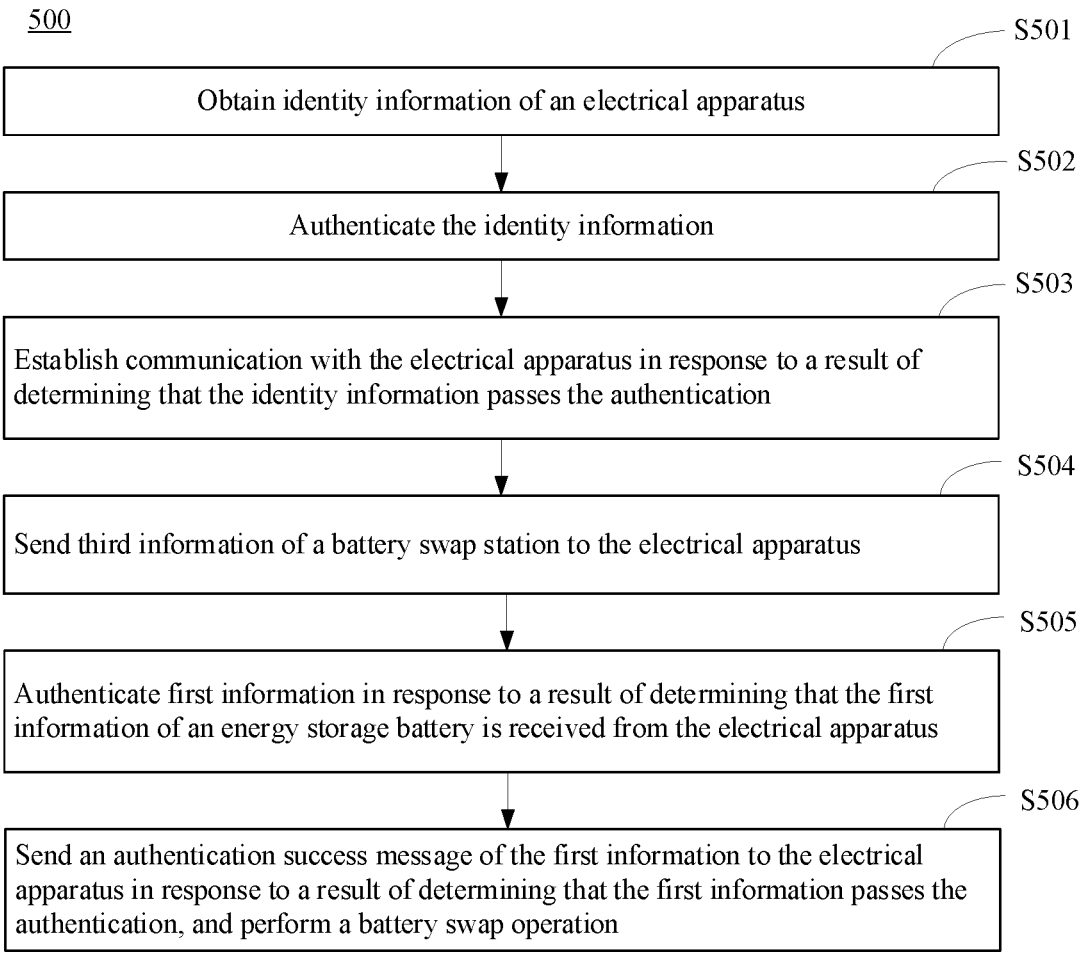
FIG. 5 is a flowchart of a battery swap authentication method according to still other embodiments of this application.

FIG. 5 is a flowchart of a battery swap authentication method according to other embodiments of this application. Referring to FIG. 5, an embodiment of this application provides a battery swap authentication method 500. The method 500 includes the following steps S501 to S506.

Step S501: Obtain identity information of an electrical apparatus 20.

Step S502: Authenticate the identity information.

Step S503: Establish communication with the electrical apparatus 20 in response to a result of determining that the identity information passes the authentication.

Step S504: Send third information of a battery swap station 10 to the electrical apparatus 20.

Step S505: Authenticate first information in response to a result of determining that the first information of an energy storage battery is received from the electrical apparatus 20.

Step S506: Send an authentication success message of the first information to the electrical apparatus in response to a result of determining that the first information passes the authentication, and perform a battery swap operation.

Steps S501 to S503 and step S506 are implemented in the same way as steps S301 to S303 and step S305 in the foregoing embodiment respectively, details of which can be learned by referring to the foregoing embodiment. In addition, this embodiment differs from the embodiment shown in FIG. 3 in that, in this embodiment, step S504 is added before step S304, and step S304 in FIG. 3 is specifically configured to include step S505.

The third information may be information used to identify the battery swap station 10. For example, the third information may be a name code, location code, or the like of the battery swap station 10; or the third information may be a barcode, serial number, or the like of a component (such as a chip) in the battery swap station 10. Understandably, the third information varies between battery swap stations 10. That is, the third information can be used to accurately identify a battery swap station 10.

In some embodiments, the type of the third information may be identical to the type of the first information and the type of the second information, all of which may be, for example, a barcode or the like of a chip. In other embodiments, the three pieces of information may vary in type, or two thereof may be of the same type, which may be set according to the specific situation.

Understandably, after communication is established between the battery swap station 10 and the electrical apparatus 20, the battery swap station 10 may send its own third information to the electrical apparatus 20, so that the electrical apparatus 20 authenticates the third information of the battery swap station 10 to verify whether the battery swap station 10 is a qualified or licensed battery swap station. If the third information passes the authentication, the electrical apparatus 20 may send the first information of the energy storage battery as an authentication success message of the third information to the battery swap station 10. The battery swap station 10 may authenticate the first information. If the first information passes the authentication, the energy storage battery satisfies the battery swap rule. In this case, an authentication success message of the first information may be sent to the electrical apparatus 20, and a battery swap operation may be performed on the energy storage battery.

Definitely, in other embodiments, step S506 may specifically include step S401 and step S402 described in the foregoing embodiment. To be specific, after the electrical apparatus 20 authenticates the third information and the battery swap station 10 authenticates the first information, if the first information passes the authentication, the battery swap station 10 sends the second information of the shared battery as an authentication success message of the first information to the electrical apparatus 20. If the second information passes the authentication, the electrical apparatus 20 sends an authentication success message of the second information to the battery swap station 10. The battery swap station 10 may perform a battery swap operation after receiving the authentication success message of the second information.

The electrical apparatus 20 may authenticate the third information in various ways. For example, using a barcode of a chip in the battery swap station 10 as an example of the third information, the cloud database may store barcodes of chip barcodes of all available battery swap stations 10. The received chip barcode is matched with the chip barcodes in the cloud database. If the same barcode is matched successfully in the cloud database, it is determined that the third information passes the authentication. If the same barcode is absent in the database, it is determined that the third information fails the authentication, and in this case, a fault alarm may be raised to prompt the electrical apparatus 20 to exit the battery swap station.

By adding a process of the electrical apparatus 20 authenticating the third information of the battery swap station 10, it can be determined that the battery swap station 10 performing the battery swap operation is qualified or licensed, thereby further improving security and reliability of battery swapping. In addition, by using the first information as an authentication success message of the third information, the number of interactions between the battery swap station and the electrical apparatus is reduced, and the efficiency of battery swap authentication is improved.

Figure 6:
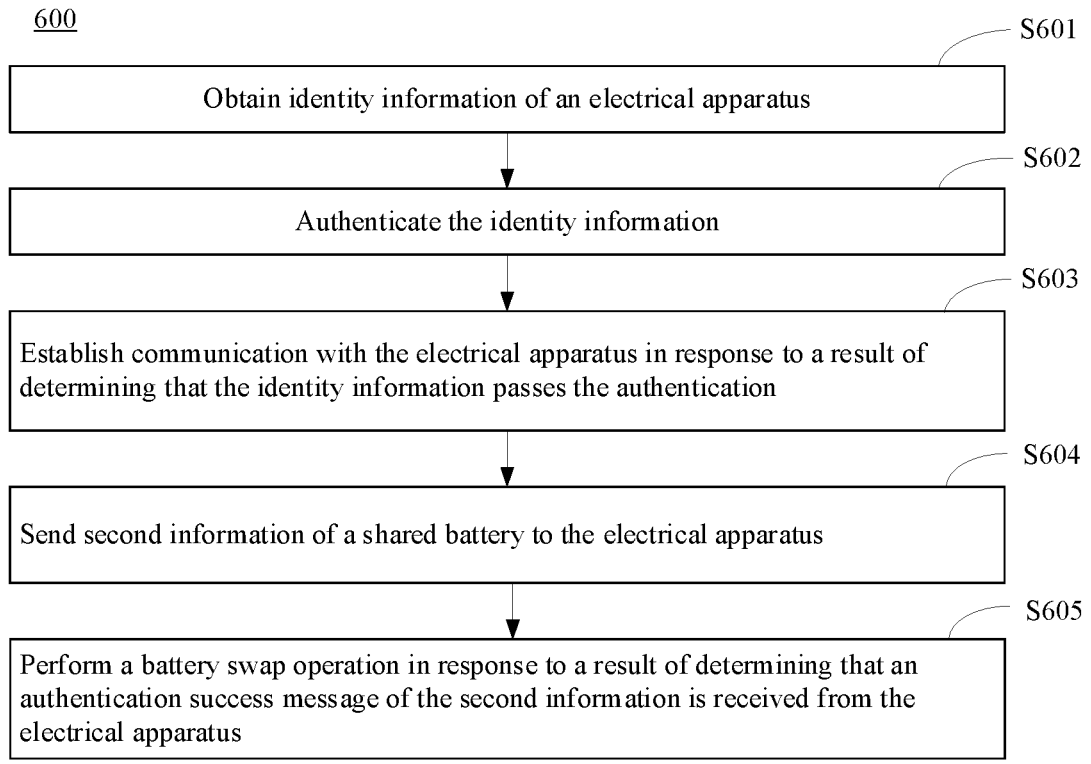
FIG. 6 is a flowchart of a battery swap authentication method according to still other embodiments of this application.

FIG. 6 is a flowchart of a battery swap authentication method according to still other embodiments of this application. Referring to FIG. 6, an embodiment of this application further provides a battery swap authentication method 600. The method 600 includes the following steps S601 to S604.

Step S601: Obtain identity information of an electrical apparatus 20.
Step S602: Authenticate the identity information.
Step S603: Establish communication with the electrical apparatus 20 in response to a result of determining that the identity information passes the authentication.
Step S604: Send second information of a shared battery to the electrical apparatus 20.
Step S605: Perform a battery swap operation in response to a result of determining that an authentication success message of the second information is received from the electrical apparatus 20.

Steps S601 to S603 are implemented in the same way as steps S201 to S203 in the foregoing embodiment, details of which can be learned by referring to the foregoing embodiment. This embodiment differs from the embodiment shown in FIG. 2 in that, in this embodiment, step S604 is added after step S603, and step S204 in FIG. 2 is specifically configured to include step S605.

In addition, the meaning of the second information and the authentication method of the second information are the same as those described in the foregoing embodiment, details of which can be learned by referring to the foregoing embodiment and are not be repeated here.

Understandably, in this embodiment, the condition for performing the battery swap operation is that the second information of the shared battery passes the authentication.

After the communication is established between the battery swap station 10 and the electrical apparatus 20, the battery swap station 10 sends the second information of the shared battery to the electrical apparatus 20 for authentication. The electrical apparatus 20 may authenticate the second information. If the second information passes the authentication, the electrical apparatus 20 may send an authentication success message of the second information to the battery swap station 10. The battery swap station 10 may perform a battery swap operation after receiving the authentication success message of the second information.

In this method, after the battery swap station 10 authenticates the identity information of the electrical apparatus 20, the battery swap station 10 needs to send the second information of the shared battery to the electrical apparatus for authentication, and performs the battery swap operation on condition that the authentication success message of the second information is received, thereby ensuring that the shared battery as a replacement to the electrical apparatus 20 is superior in quality, improving reliability and security of authentication during a battery swap, and avoiding substandard replacements.

In some embodiments, step S605 may specifically include substep I and sub step II.

Substep I: Authenticate first information in response to a result of determining that the first information of the energy storage battery is received from the electrical apparatus.

Substep II: Send an authentication success message of the first information to the electrical apparatus in response to a result of determining that the first information passes the authentication, and perform the battery swap operation.

The meaning of the first information and the authentication method of the first information are the same as those described in the foregoing embodiment, details of which can be learned by referring to the foregoing embodiment and are not be repeated here.

In this embodiment, after the electrical apparatus 20 authenticates the second information successfully, the electrical apparatus 20 may send the first information as an authentication success message of the second information to the battery swap station 10. The battery swap station 10 may authenticate the first information, and, if the first information passes the authentication, send an authentication success message of the first information to the electrical apparatus 20, and perform a battery swap operation.

Understandably, after the battery swap station 10 authenticates the identity information of the electrical apparatus 20 successfully, the electrical apparatus 20 authenticates the second information of the shared battery first. If the authentication succeeds, the battery swap station 10 authenticates the first information of the energy storage battery, and performs a battery swap operation after the first information passes the authentication.

This method authenticates not only the identity of the electrical apparatus 20, but also the shared battery and the energy storage battery, thereby not only ensuring that the energy storage battery as a replacement to the battery swap station 10 is superior in quality, but also ensuring that the shared battery as a replacement to the electrical apparatus 20 is superior in quality, and further improving security and reliability of authentication during a battery swap.

In addition, on the basis of the embodiment shown in FIG. 6, after step S603, the battery swap authentication method may further include substep III and substep IV.

Substep III: Send third information of the battery swap station 10 to the electrical apparatus 20.

Substep IV: Send the second information of the shared battery to the electrical apparatus 20 in response to a result of determining that an authentication success message of the third information is received from the electrical apparatus 20.

The meaning of the third information and the authentication method of the third information are the same as those described in the foregoing embodiment, details of which can be learned by referring to the foregoing embodiment and are not be repeated here. Understandably, sub-steps III and IV may be performed after step S603 or before step S605.

In this embodiment, after the battery swap station 10 authenticates the identity information of the electrical apparatus 20, the battery swap station 10 may send its own third information to the electrical apparatus 20, so that the electrical apparatus 20 authenticates the third information of the battery swap station 10 to verify whether the battery swap station 10 is a qualified or licensed battery swap station. If the third information passes the authentication, the electrical apparatus 20 may send an authentication success message of the third information to the battery swap station 10. Upon receiving the authentication success message of the third information, the battery swap station 10 may send the second information of the shared battery to the electrical apparatus 20. The electrical apparatus 20 authenticates the second information. After the authentication succeeds, the electrical apparatus 20 sends an authentication success message of the second information to the battery swap station 10. The battery swap station 10 may perform a battery swap operation on the energy storage battery after receiving the message.

In other embodiments, step S605 may further specifically include substep I and substep II described in the foregoing embodiment. To be specific, after authenticating the third information and the second information, the electrical apparatus 20 may send the first information of the energy storage battery as an authentication success message of the second information to the battery swap station 10. The battery swap station 10 authenticates the first information, and, after the authentication succeeds, sends an authentication success message of the first information to the electrical apparatus 20, and performs a battery swap operation.

By adding a process of the electrical apparatus authenticating the third information of the battery swap station, it can be determined that the battery swap station performing the battery swap operation is qualified or licensed, thereby further improving security and reliability of battery swapping.

In some embodiments, step S202 may further specifically include: finding a MAC address of the electrical apparatus based on a correspondence between the identity information and the MAC address, where the identity information includes marker information of the electrical apparatus.

Step S203 may specifically include: establishing communication with the electrical apparatus by use of the MAC address of the electrical apparatus in response to a result of determining that the MAC address of the electrical apparatus is found in the correspondence between the identity information and the MAC address.

In this embodiment, the identity information may be the marker information of the electrical apparatus. This information is easily available, thereby simplifying the process of authenticating the identity information. A Media Access Control (MAC) address may be a MAC address of a component in the electrical apparatus 20. Understandably, the MAC address can be unique and can be used as information for distinguishing the electrical apparatus. In addition, the MAC address can be used to check the location of the electrical apparatus to facilitate the establishment of communication. Specifically, using a vehicle as an example of the electrical apparatus 20, the marker information may be license plate information, vehicle model, or the like.

The database of the battery swap station 10 may store the correspondence between the identity information and the MAC address. After obtaining the identity information, the battery swap station 10 may search the database for the MAC address of the corresponding electrical apparatus. If the corresponding MAC address is found, it is determined that the identity information passes the authentication. If the corresponding MAC address is not found, it is determined that the identity information fails the authentication.

In some embodiments, the MAC address may be a MAC address of a communication module of the electrical apparatus, for example, may be a MAC address of a master battery management unit (MBMU). After finding the corresponding MAC address, the battery swap station 10 may further use the MAC address to attempt to establish communication with the MBMU of the electrical apparatus 20. If the communication is established successfully, the battery swap authentication may be performed. If the communication fails, the connection to the MBMU may be re-attempted. If the communication between the battery swap station and the electrical apparatus keeps failing to be established within a preset period, a fault alarm may be raised.

Definitely, in other embodiments, the MAC address may be a MAC address of another chip instead.

By using the marker information as the identity information of the electrical apparatus, the difficulty of obtaining the identity information can be reduced. In addition, whether the MAC address of the electrical apparatus is found is used as a condition for determining whether the identity information is successfully authenticated, thereby not only authenticating the identity of the electrical apparatus, but also facilitating the establishment of communication with the electrical apparatus. In addition, compared with the VIN in the related art, the MAC address is more difficult to obtain, and is more confidential. By using the MAC address for authentication, only the device that grasps the MAC address of the electrical apparatus can establish communication with the electrical apparatus, thereby effectively resisting malicious connections and improving security.

On the basis of the foregoing embodiment, the first information may include: first identification information and first encrypted information. The first encrypted information is generated by encrypting the first identification information by use of a private key, and the private key is stored in production equipment of the energy storage battery.

The step of authenticating the first information may specifically include: decrypting the first encrypted information by use of a public key corresponding to the private key to generate first decrypted information, where the public key is stored in the battery swap station; and comparing the first decrypted information with the first identification information. In addition, the determining that the first information passes the authentication may specifically include: determining that the first decrypted information is identical to the first identification information.

The first identification information may be a barcode, serial number, or the like of the energy storage battery. In some embodiments, a slave battery management unit (SBMU) may be disposed in each battery. For ease of differentiation, a first SBMU is used as a slave battery management unit of the energy storage battery, and a second SBMU is used as a slave battery management unit of the shared battery.

The first identification information may be a barcode of the first SBMU. The first encrypted information may be a digital signature generated by encrypting the first identification information, such as a digital signature of the first SBMU.

Understandably, an encryption process of the first identification information is implemented in the production process of the energy storage battery. That is, a private key used for encryption is stored in the production equipment of the energy storage battery. Both the barcode and the digital signature of the first SBMU may be stored in the energy storage battery in the production process of the energy storage battery.

The battery swap station 10 may store a public key corresponding to the private key. The public key may be used to decrypt the digital signature of the first SBMU. In some embodiments, a battery charging management unit (Central Battery Management Unit, CBMU) may be disposed in the battery swap station 10. The public key may be stored in the CBMU in the production process of the CBMU. That is, the first information is authenticated by the CBMU. In addition, the private key and the public key form a key pair. The private key is non-public, and the public key may be public. The private key may be used for encryption, and the public key may be used for decryption. The specific encryption and decryption methods may be commonly used encryption and decryption methods, such as knapsack algorithm, elliptic curve cryptography, and the like. Understandably, the public key can be stored separately, but not necessarily stored in a certificate that is then to be stored. Therefore, the time to be taken to parse the certificate to obtain the public key is saved, and the space for storing the certificate is saved.

Specifically, using an example in which a barcode of the first SBMU serves as the first marker information, in a process of authenticating the first information, the CBMU may use the public key to decrypt the digital signature of the first SBMU first to obtain the first decrypted information. The type of the first decrypted information is the same as the type of the first marker information, that is, the first decrypted information may be a barcode obtained by decrypting. Subsequently, the CBMU may compare the barcode of the first SBMU with the barcode obtained by decrypting. If the two barcodes are identical, it is determined that the first information passes the authentication. If the two barcodes are not identical, it is determined that the first information fails the authentication.

In some embodiments, if the first information fails the authentication, the authentication of the first information may be re-attempted. If the first information keeps failing the authentication within a preset period, it is determined that the first information fails the authentication, and a fault alarm is raised.

By encrypting the first information, the security and reliability of authentication during a battery swap can be improved. In addition, because the private key is stored only in the production equipment and is more confidential, the risk of divulging the private key is reduced, and the security of authentication during the battery swap is further improved. In addition, compared with the challenge-response authentication mechanism in the related art, the authenticating the first information by use of a public key reduces the amount of calculation, improves the calculation speed, facilitates lightweight development, and is more suitable to the real-time requirement of vehicular communication. In addition, for authenticating the first information by use of an asymmetric algorithm of the private key and the public key, only one key pair needs to be managed, thereby reducing the cost of key management in comparison with a symmetric key-based solution.

In some embodiments, the second information may include: second identification information and second encrypted information. The second encrypted information is generated by encrypting the second identification information by use of a private key, and the private key is stored in production equipment of the shared battery.

The second identification information may be a barcode, serial number, or the like of the shared battery. In some embodiments, the second identification information may be a barcode of the second SBMU. The second encrypted information may be a digital signature generated by encrypting the second identification information, such as a digital signature of the second SBMU.

Understandably, an encryption process of the second identification information is implemented in the production process of the shared battery. That is, a private key used for encryption is stored in the production equipment of the shared battery. Both the barcode and the digital signature of the second SBMU may be stored in the shared battery in the production process of the shared battery.

The electrical apparatus 20 may store a public key corresponding to the private key. The public key may be used to decrypt the digital signature of the second SBMU. In some embodiments, the public key may be stored in the MBMU of the electrical apparatus 20, for example, stored in the MBMU in the production process of the MBMU. The MBMU can authenticate the first information.

In addition, the specific authentication method of the second information and the method for determining successful authentication of the second information are the same as the authentication method of the first information and the method for determining successful authentication of the first information, respectively, in the foregoing embodiment, details of which can be learned by referring to the foregoing embodiment and are not be repeated here.

By encrypting the second information, the safety and reliability of authentication during a battery swap can be improved. In addition, because the private key is stored only in the production equipment and is more confidential, the security of authentication during the battery swap is further improved.

In some embodiments, the third information may include: third identification information and third encrypted information. The third encrypted information is generated by encrypting the third identification information by use of a private key, and the private key is stored in production equipment of the battery swap station 10.

The third identification information may be a barcode, serial number, or the like of a component in the battery swap station. In some embodiments, a battery communication management unit (Transmission Battery Management Unit, TBMU) may be disposed in the battery swap station 10, and the third identification information may be a barcode of the TBMU. The second encrypted information may be a digital signature generated by encrypting the second identification information, such as a digital signature of the TBMU.

Understandably, an encryption process of the third identification information is implemented in the production process of the TBMU. That is, a private key used for encryption is stored in the production equipment of the TBMU. Both the barcode and the digital signature of the TBMU may be stored in the TBMU in the production process of the TBMU.

The electrical apparatus 20 may store a public key corresponding to the private key. The public key may be used to decrypt the digital signature of the TBMU. In some embodiments, the public key may be stored in the MBMU of the electrical apparatus 20, for example, stored in the MBMU in the production process of the MBMU. The MBMU can authenticate the first information.

In addition, the specific authentication method of the third information and the method for determining successful authentication of the third information are the same as the authentication method of the first information and the method for determining successful authentication of the first information, respectively, in the foregoing embodiment, details of which can be learned by referring to the foregoing embodiment and are not be repeated here.

By encrypting the third information, the security and reliability of authentication during a battery swap can be improved. In addition, because the private key is stored only in the production equipment and is more confidential, the security of authentication during the battery swap is further improved.

Figure 7:
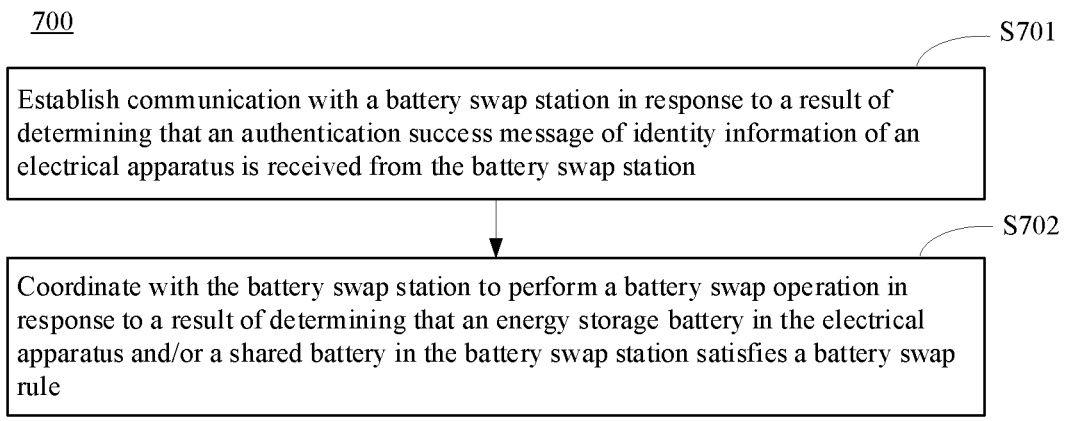
FIG. 7 is a flowchart of a battery swap authentication method according to still other embodiments of this application.

FIG. 7 is a flowchart of a battery swap authentication method according to still other embodiments of this application. Referring to FIG. 7, in order to implement interaction with the battery swap station 10, an embodiment of this application further provides a battery swap authentication method 700, applied to an electrical apparatus 20. The method 700 may include: step S701 and step S702.

Step S701: Establish communication with a battery swap station 10 in response to a result of determining that an authentication success message of identity information of an electrical apparatus is received from the battery swap station 10.

Step S702: Coordinate with the battery swap station to perform a battery swap operation in response to a result of determining that an energy storage battery in the electrical apparatus and/or a shared battery in the battery swap station satisfies a battery swap rule.

Understandably, the method 700 in this embodiment is applicable to the electrical apparatus 20, and is implemented to perform battery swap authentication by interacting with the battery swap station 10. In addition, for the detailed content of the battery swap authentication method applicable to a battery swap station 10 in each embodiment, for example, the meaning of the identity information, the process by which the battery swap station 10 authenticates the identity information of the electrical apparatus 20, and the like, the details are omitted here and can be learned by referring to the foregoing embodiments.

In this embodiment, after receiving the authentication success message of the identity information from the battery swap station 10, the electrical apparatus 20 may establish communication with the battery swap station 10, determine whether the energy storage battery in the electrical apparatus 20 and/or the shared battery in the battery swap station 10 satisfies the battery swap rule, and coordinate with the battery swap station 10 to perform a battery swap operation on condition that the battery swap rule is satisfied. For example, the electrical apparatus 20 may send a prompt message to prompt the driver to take up the battery swap operation, unlock the energy storage battery, power off, or the like. If the battery swap rule is not satisfied, the driver may be prompted to exit the battery swap station 10.

In the battery swap authentication method according to this embodiment, before the battery swap operation is performed, whether the energy storage battery in the electrical apparatus 20 and/or the shared battery in the battery swap station 10 satisfies the battery swap rule is verified in addition to authentication of the identity information of the electrical apparatus. That is, a step of authenticating the batteries is added, thereby improving security and reliability of authentication during a battery swap.

In some embodiments, after step S701, the method may further include: sending first information of the energy storage battery to the battery swap station 10; and step S702 may specifically include: coordinating with the battery swap station to perform the battery swap operation in response to a result of determining that an authentication success message of the first information is received from the battery swap station.

Specifically, after the communication is established between the electrical apparatus 20 and the battery swap station 10, the electrical apparatus 20 may first send the first information of the energy storage battery to the battery swap station 10 for authentication. If the battery swap station 10 determines that the first information passes the authentication, the battery swap station 10 may send an authentication success message of the first information to the electrical apparatus 20. After receiving the authentication success message of the first information, the electrical apparatus 20 may coordinate with the battery swap station 10 to perform a battery swap operation.

In this method, after the battery swap station 10 authenticates the identity information of the electrical apparatus 20, the battery swap station 10 further authenticates the first information of the energy storage battery, and performs the battery swap operation after success of the authentication, thereby ensuring that the energy storage battery as a replacement to the battery swap station 10 is superior in quality, improving reliability and security of authentication during the battery swap, avoiding substandard replacements, and further improving safety of other electrical apparatuses that subsequently use this energy storage battery. It needs to be noted that when the electrical apparatus 20 is a vehicle, the durability of the vehicle can be improved.

In some embodiments, the step of coordinating with the battery swap station 10 to perform the battery swap operation in response to a result of determining that an authentication success message of the first information is received from the battery swap station 10 may specifically include: authenticating second information in response to a result of determining that the second information of the shared battery is received from the battery swap station 10; and sending an authentication success message of the second information to the battery swap station 10 in response to a result of determining that the second information passes the authentication, and coordinating with the battery swap station 10 to perform the battery swap operation.

To be specific, after the battery swap station 10 authenticates the identity information of the electrical apparatus 20, the electrical apparatus 20 first sends the first information to the battery swap station 10 for authentication. After the authentication succeeds, the battery swap station 10 sends the second information of the shared battery as an authentication success message of the first information to the electrical apparatus 20 for authentication. After the second information passes the authentication, the electrical apparatus 20 may send an authentication success message of the second information to the battery swap station 10. In addition, the electrical apparatus 20 may coordinate with the battery swap station 10 to perform a battery swap operation.

This method authenticates not only the identity of the electrical apparatus 20, but also the shared battery and the energy storage battery, thereby not only ensuring that the energy storage battery as a replacement to the battery swap station 10 is superior in quality, but also ensuring that the shared battery as a replacement to the electrical apparatus 20 is superior in quality, and further improving security and reliability of authentication during a battery swap.

In some embodiments, after step S701, the method may further include: receiving third information of the battery swap station sent by the battery swap station 10; authenticating the third information; and sending the first information of the energy storage battery to the battery swap station 10 in response to a result of determining that the third information passes the authentication.

Specifically, after communication is established between the battery swap station 10 and the electrical apparatus 20, the electrical apparatus 20 may receive third information sent by the battery swap station 10, and authenticate the third information to verify whether the battery swap station 10 is a qualified or licensed battery swap station. If the third information passes the authentication, the electrical apparatus 20 may send the first information of the energy storage battery as an authentication success message of the third information to the battery swap station 10. The battery swap station 10 may authenticate the first information. If the first information passes the authentication, the electrical apparatus 20 may receive an authentication success message of the first information from the battery swap station 10, and coordinate with the battery swap station 10 to perform a battery swap operation.

Definitely, in other embodiments, after the first information passes the authentication, the battery swap station 10 may further send the second information of the shared battery as an authentication success message of the first information to the electrical apparatus 20. The electrical apparatus 20 authenticates the second information. If the authentication succeeds, the electrical apparatus 20 sends an authentication success message of the second information to the battery swap station 10, and may coordinate with the battery swap station 10 to perform a battery swap operation.

By adding a process of the electrical apparatus 20 authenticating the third information of the battery swap station 10, it can be determined that the battery swap station 10 performing the battery swap operation is qualified or licensed, thereby further improving security and reliability of battery swapping. In addition, by using the first information as an authentication success message of the third information, the number of interactions between the battery swap station and the electrical apparatus is reduced, and the efficiency of battery swap authentication is improved.

In some embodiments, after step S701, the method may further include: receiving second information of the shared battery sent by the battery swap station 10; and authenticating the second information.

In step S702, the coordinating with the battery swap station 10 to perform a battery swap operation in response to a result of determining that an energy storage battery in the electrical apparatus 20 and/or a shared battery in the battery swap station satisfies a battery swap rule may specifically include: sending an authentication success message of the second information to the electrical apparatus in response to a result of determining that the second information passes the authentication, and coordinating with the battery swap station 10 to perform the battery swap operation.

In this embodiment, the condition for performing the battery swap operation is that the second information of the shared battery passes the authentication. After the communication is established between the battery swap station 10 and the electrical apparatus 20, the battery swap station 10 sends the second information of the shared battery to the electrical apparatus 20 for authentication. The electrical apparatus 20 may authenticate the second information. If the second information passes the authentication, the electrical apparatus 20 may send an authentication success message of the second information to the battery swap station 10, and coordinate with the battery swap station 10 to perform a battery swap operation.

In this method, after the battery swap station 10 authenticates the identity information of the electrical apparatus 20, the electrical apparatus 20 further needs to authenticate the second information of the shared battery, and coordinate with the battery swap station 10 to perform the battery swap operation after the authentication succeeds, thereby ensuring that the shared battery as a replacement to the electrical apparatus 20 is superior in quality, improving reliability and security of authentication during a battery swap, and avoiding substandard replacements.

In some embodiments, the step of sending an authentication success message of the second information to the electrical apparatus in response to a result of determining that the second information passes the authentication, and coordinating with the battery swap station to perform a battery swap operation, may specifically include: sending the first information of the energy storage battery to the battery swap station 10 in response to a result of determining that the second information passes the authentication; and coordinating with the battery swap station 10 to perform the battery swap operation in response to a result of determining that an authentication success message of the first information is received from the battery swap station 10.

Specifically, after the battery swap station 10 authenticates the identity information of the electrical apparatus 20 successfully, the electrical apparatus 20 authenticates the second information of the shared battery first. If the authentication succeeds, the battery swap station 10 authenticates the first information of the energy storage battery. Upon receiving an authentication success message of the first information, the electrical apparatus 20 coordinates with the battery swap station 10 to perform a battery swap operation.

This method authenticates not only the identity of the electrical apparatus 20, but also the shared battery and the energy storage battery, thereby not only ensuring that the energy storage battery as a replacement to the battery swap station 10 is superior in quality, but also ensuring that the shared battery as a replacement to the electrical apparatus 20 is superior in quality, and further improving security and reliability of authentication during a battery swap.

In some embodiments, after step S701, the method may further include: receiving third information of the battery swap station sent by the battery swap station 10; authenticating the third information; and sending an authentication success message of the third information to the battery swap station 10 in response to a result of determining that the third information passes the authentication, and receiving the second information of the shared battery sent by the battery swap station 10.

In this embodiment, after communication is established between the battery swap station 10 and the electrical apparatus 20, the electrical apparatus 20 may receive third information sent by the battery swap station 10, and authenticate the third information to verify whether the battery swap station 10 is a qualified or licensed battery swap station. If the third information passes the authentication, the electrical apparatus 20 may send an authentication success message of the third information to the battery swap station 10. Upon receiving the authentication success message of the third information, the battery swap station 10 may send the second information of the shared battery to the electrical apparatus 20. The electrical apparatus 20 authenticates the second information. After the authentication succeeds, the electrical apparatus 20 sends an authentication success message of the second information to the battery swap station 10. The battery swap station 10 may perform a battery swap operation on the energy storage battery after receiving the message.

In other embodiments, after the electrical apparatus 20 authenticates the third information and the second information, the electrical apparatus 20 may send the first information of the energy storage battery as an authentication success message of the second information to the battery swap station 10 for authentication, and coordinate with the battery swap station to perform a battery swap operation after receiving the authentication success message of the first information.

By adding a process of the electrical apparatus authenticating the third information of the battery swap station, it can be determined that the battery swap station performing the battery swap operation is qualified or licensed, thereby further improving security and reliability of battery swapping.

In some embodiments, step S701 may specifically include: establishing communication with the battery swap station in response to a result of determining that a communication request sent by the battery swap station by use of a MAC address of the electrical apparatus is received, where the MAC address of the electrical apparatus corresponds to the identity information of the electrical apparatus, and the identity information includes marker information of the electrical apparatus.

In an example in which the electrical apparatus 20 communicates with the battery swap station 10 through Bluetooth, the electrical apparatus 20 may keep sending broadcast messages. After the identity information is authenticated successfully, the battery swap station 10 can obtain the MAC address of the electrical apparatus, and establish communication with the electrical apparatus 20 by use of the MAC address.

By using the marker information as the identity information of the electrical apparatus, the difficulty of obtaining the identity information can be reduced. In addition, whether the MAC address of the electrical apparatus is found is used as a condition for determining whether the identity information is successfully authenticated, thereby not only authenticating the identity of the electrical apparatus, but also facilitating the establishment of communication with the electrical apparatus. In addition, compared with the VIN in the related art, the MAC address is more difficult to obtain, and is more confidential. The MAC address used for authentication can also improve security.

In some embodiments, the first information includes: first identification information and first encrypted information. The first encrypted information is generated by encrypting the first identification information by use of a private key, and the private key is stored in production equipment of the energy storage battery.

By encrypting the first information, the security and reliability of authentication during a battery swap can be improved. In addition, because the private key is stored only in the production equipment and is more confidential, the security of authentication during the battery swap is further improved.

In some embodiments, the second information may include: second identification information and second encrypted information. The second encrypted information is generated by encrypting the second identification information by use of a private key, and the private key is stored in production equipment of the shared battery.

The step of authenticating the second information may specifically include: decrypting the second encrypted information by use of a public key corresponding to the private key to generate second decrypted information, where the public key is stored in the electrical apparatus; and comparing the second decrypted information with the second identification information. The determining that the second information passes the authentication may specifically include: determining that the second decrypted information is identical to the second identification information.

By encrypting the second information, the safety and reliability of authentication during a battery swap can be improved. In addition, because the private key is stored only in the production equipment and is more confidential, the security of authentication during the battery swap is further improved.

In some embodiments, the third information includes: third identification information and third encrypted information. The third encrypted information is generated by encrypting the third identification information by use of a private key, and the private key is stored in production equipment of the battery swap station.

The step of authenticating the third information may specifically include: decrypting the third encrypted information by use of a public key corresponding to the private key to generate third decrypted information, where the public key is stored in the electrical apparatus; and comparing the third decrypted information with the third identification information. The determining that the third information passes the authentication may specifically include: determining that the third decrypted information is identical to the third identification information.

By encrypting the third information, the security and reliability of authentication during a battery swap can be improved. In addition, because the private key is stored only in the production equipment and is more confidential, the security of authentication during the battery swap is further improved.

Understandably, the content that has been described in detail with respect to the battery swap station 10, such as the process of authenticating the first information, the second information, and the third information by use of the public key, will be omitted in the description with respect to the electrical apparatus 20. For details, refer to the embodiments described above.

Figure 8:
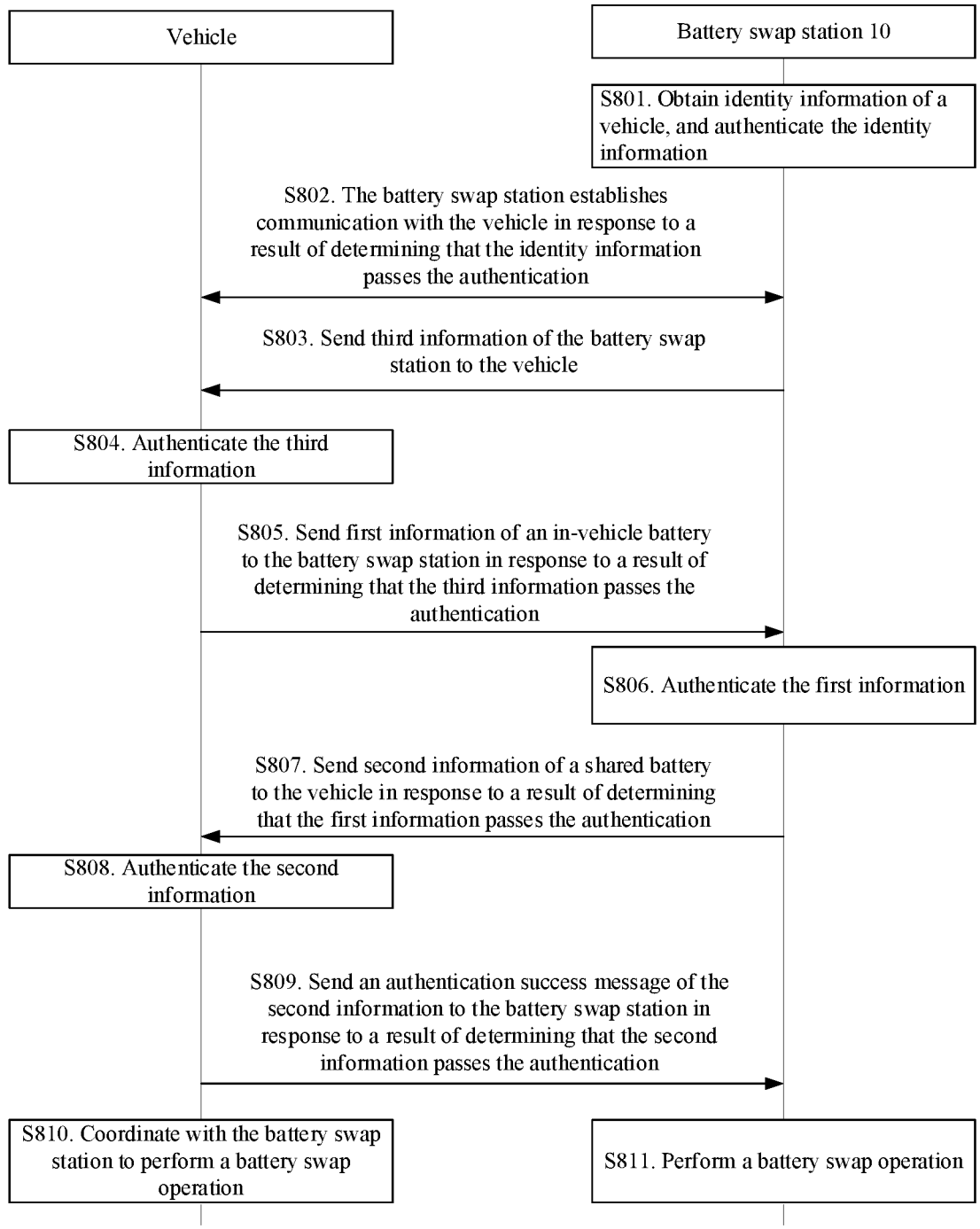
FIG. 8 is a workflow chart of battery swap authentication between a battery swap station and a vehicle according to some embodiments of this application.

FIG. 8 is a workflow chart of battery swap authentication between a battery swap station and a vehicle according to some embodiments of this application. Referring to FIG. 8, in a specific embodiment, the electrical apparatus is a vehicle, and a workflow of battery swap authentication between the battery swap station and the vehicle may include steps S801 to S811.

Step S801: A battery swap station 10 obtains identity information of a vehicle, and authenticates the identity information.

Step S802: The battery swap station 10 establishes communication with the vehicle 20 in response to a result of determining that the identity information passes the authentication.

Step S803: The battery swap station 10 sends third information of the battery swap station to the vehicle 20.

Step S804: The vehicle 20 authenticates the third information.

Step S805: The vehicle 20 sends first information of an in-vehicle battery to the battery swap station 10 in response to a result of determining that the third information passes the authentication.

Step S806: The battery swap station 10 authenticates the first information.

Step S807: The battery swap station 10 sends second information of a shared battery to the vehicle 20 in response to a result of determining that the first information passes the authentication.

Step S808: The vehicle 20 authenticates the second information.

Step S809: The vehicle 20 sends an authentication success message of the second information to the battery swap station 10 in response to a result of determining that the second information passes the authentication.

Step S810: The vehicle 20 coordinates with the battery swap station to perform a battery swap operation.

Step S811: The battery swap station 10 performs the battery swap operation.

The sequence between step S811 and step S810 is not specifically limited. In addition, the sequence between step S811, and step S810 in which the vehicle 20 sends the authentication success information of the second information to the battery swap station 10, is not specifically limited.

Figure 9A:
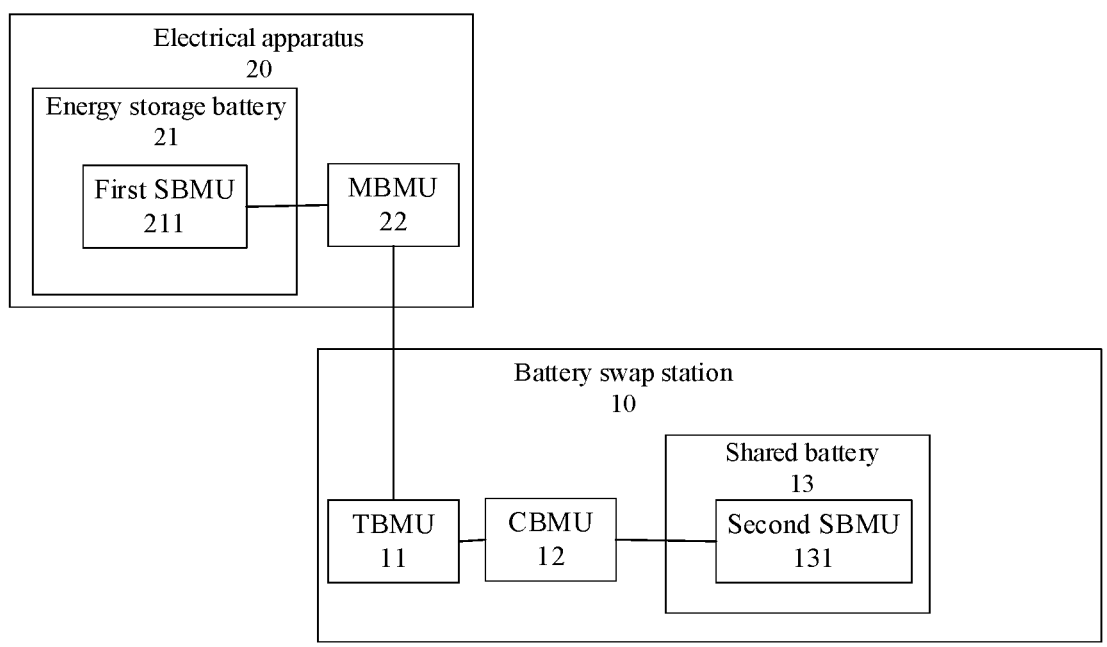
FIG. 9A is a schematic diagram of connections between a battery swap station and an electrical apparatus according to some embodiments of this application.
Figure 9B:
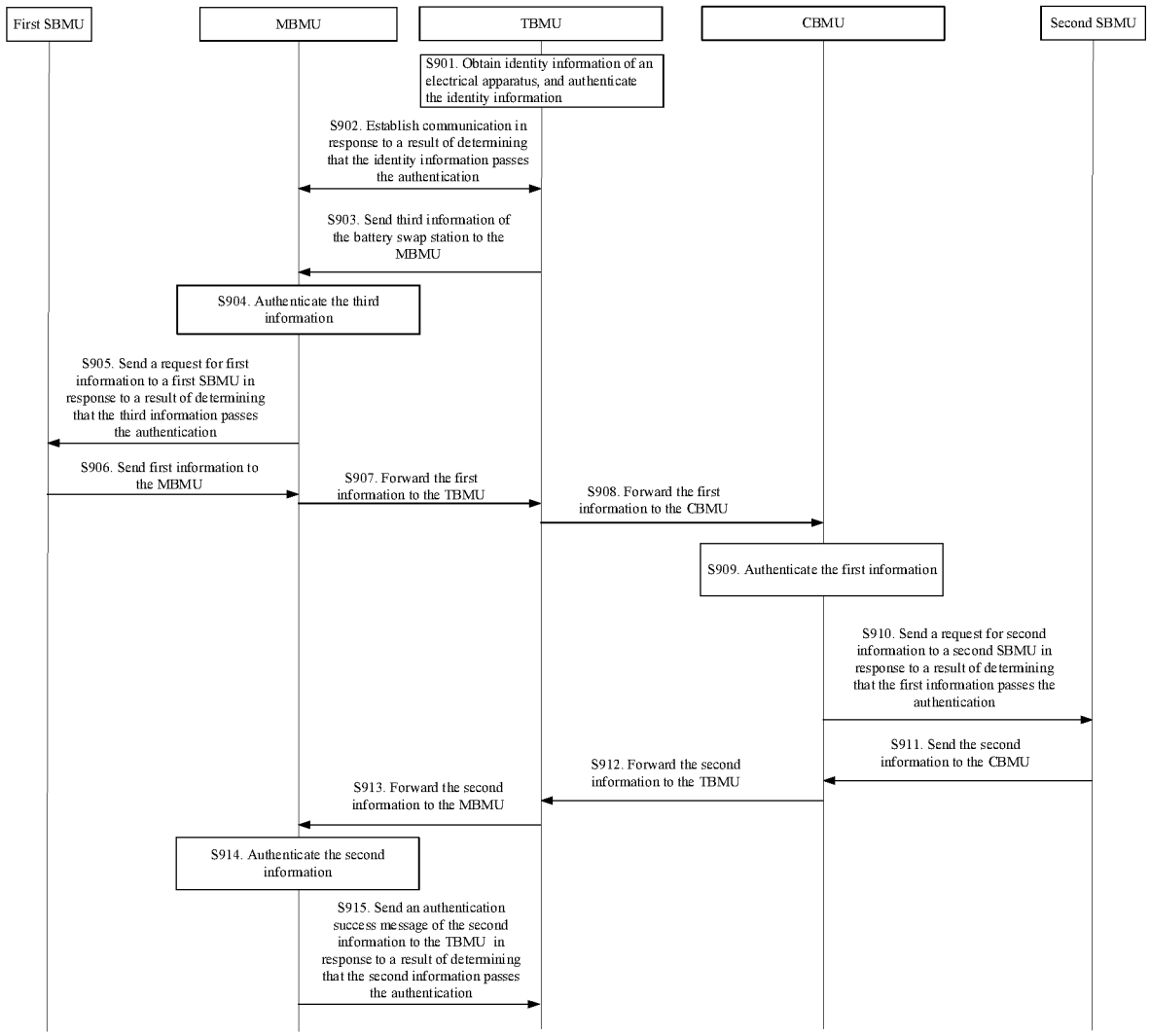
FIG. 9B is a system workflow chart of battery swap authentication between a battery swap station and an electrical apparatus according to other embodiments of this application.

FIG. 9A is a schematic diagram of connections between a battery swap station and an electrical apparatus according to some embodiments of this application; and FIG. 9B is a system workflow chart of battery swap authentication between a battery swap station and an electrical apparatus according to other embodiments of this application.

Referring to FIG. 9A and FIG. 9B, in another specific embodiment, the electrical apparatus 20 includes an MBMU 22 and an energy storage battery 21. A first SBMU 211 is disposed in the energy storage battery 21. The MBMU 22 may be configured to communicate with the first SBMU 211, and monitor status of the energy storage battery 21. The first SBMU 211 may be configured to acquire the temperature, voltage status, and the like of the energy storage battery 21, and communicate with the MBMU 22.

The battery swap station 10 may include a shared battery 13, a CBMU 12, and a TBMU 11. A second SBMU 131 may be disposed in the shared battery 13. The second SBMU 131 may be configured to acquire the temperature, voltage status, and the like of the shared battery 13, and communicate with the CBMU 12. The CBMU 12 may be configured to communicate with the second SBMU 131, and send related information of the shared battery 13 to the TBMU 11. The TBMU 11 may establish communication with the CBMU 12, and may establish communication with the MUMU 22 in the electrical apparatus 20, so as to implement communication between the electrical apparatus 20 and the battery swap station 10.

Referring to FIG. 9B, in a specific embodiment, a workflow of battery swap authentication may include steps S901 to S915.

Step S901: A TBMU 11 obtains identity information of an electrical apparatus, and authenticates the identity information.

Step S902: The TBMU 11 establishes communication with an MBMU 22 in response to a result of determining that the identity information passes the authentication.

Step S903: The TBMU 11 sends third information of a battery swap station to the MBMU 22.

Step S904: The MBMU 22 authenticates the third information.

Step S905: The MBMU 22 sends a request for first information to a first SBMU 211 in response to a result of determining that the third information passes the authentication.

Step S906: The first SBMU 211 sends the first information to the MBMU 22.

Step S907: The MBMU 22 forwards the first information to the TBMU 11.

Step S908: The TBMU 11 forwards the first information to a CBMU 12.

Step S909: The CBMU 12 authenticates the first information.

Step S910: The CBMU 12 sends a request for second information to a second SBMU 131 in response to a result of determining that the first information passes the authentication.

Step S911: The second SBMU 131 sends the second information to the CBMU 12.

Step S912: The CBMU 12 forwards the second information to the TBMU 11.

Step S913: The TBMU 11 forwards the second information to the MBMU 22.

Step S914: The MBMU 22 authenticates the second information.

Step S915: The MBMU 22 sends an authentication success message of the second information to the TBMU 11 in response to a result of determining that the second information passes the authentication.

Understandably, in this embodiment, the TBMU 11 is responsible for communicating with the MBMU 22, and the CBMU 12 is responsible for managing charging of the shared battery. To be specific, different units are used in the battery swap station 10 to implement the function of communicating with the electrical apparatus 20 and the function of battery management separately, so as to reduce the processing workload of each unit and improve the processing efficiency.

Figure 10:
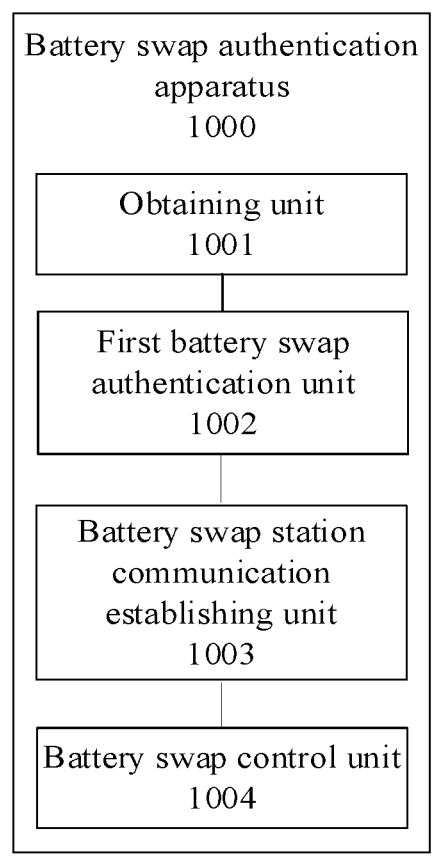
FIG. 10 is a schematic structural diagram of a battery swap authentication apparatus according to some embodiments of this application.

FIG. 10 is a schematic structural diagram of a battery swap authentication apparatus according to some embodiments of this application. Referring to FIG. 10, an embodiment of this application further provides a battery swap authentication apparatus 1000, applied to a battery swap station 10. The apparatus 100 includes: an obtaining unit 1001, a first battery swap authentication unit 1002, a battery swap station communication establishing unit 1003, and a battery swap control unit 1004.

The obtaining unit 1001 is configured to obtain identity information of an electrical apparatus. The first battery swap station authentication unit 1002 is configured to authenticate the identity information. The battery swap station communication establishing unit 1003 is configured to establish communication with the electrical apparatus in response to a result of determining that the identity information passes the authentication. The battery swap control unit 1004 is configured to perform a battery swap operation in response to a result of determining that an energy storage battery in the electrical apparatus and/or a shared battery in the battery swap station satisfies a battery swap rule.

In the battery swap authentication apparatus according to this embodiment, before the battery swap operation is performed, whether the energy storage battery in the electrical apparatus 20 and/or the shared battery in the battery swap station 10 satisfies the battery swap rule is verified in addition to authentication of the identity information of the electrical apparatus. That is, a step of authenticating the batteries is added, thereby improving security and reliability of authentication during a battery swap.

In some embodiments, the battery swap control unit is further configured to receive first information of the energy storage battery sent by the electrical apparatus; authenticate the first information; and send an authentication success message of the first information to the electrical apparatus in response to a result of determining that the first information passes the authentication, and perform the battery swap operation.

In some embodiments, the battery swap control unit is further configured to send second information of the shared battery to the electrical apparatus in response to a result of determining that the first information passes the authentication; and perform the battery swap operation in response to a result of determining that an authentication success message of the second information is received from the electrical apparatus.

In some embodiments, the battery swap control unit is further configured to send third information of the battery swap station to the electrical apparatus; and authenticate first information in response to a result of determining that the first information of the energy storage battery is received from the electrical apparatus.

In some embodiments, the battery swap control unit is further configured to send second information of the shared battery to the electrical apparatus; and perform the battery swap operation in response to a result of determining that an authentication success message of the second information is received from the electrical apparatus.

In some embodiments, the battery swap control unit is further configured to authenticate the first information in response to a result of determining that the first information of the energy storage battery is received from the electrical apparatus; and send an authentication success message of the first information to the electrical apparatus in response to a result of determining that the first information passes the authentication, and perform the battery swap operation.

In some embodiments, the battery swap control unit is further configured to send third information of the battery swap station to the electrical apparatus; and send the second information of the shared battery to the electrical apparatus in response to a result of determining that an authentication success message of the third information is received from the electrical apparatus.

In some embodiments, the first battery swap station authentication unit is further configured to find a MAC address of the electrical apparatus based on a correspondence between the identity information and the MAC address, where the identity information includes marker information of the electrical apparatus. The battery swap station communication establishing unit is further configured to establish communication with the electrical apparatus by use of the MAC address of the electrical apparatus in response to a result of determining that the MAC address of the electrical apparatus is found in the correspondence between the identity information and the MAC address.

In some embodiments, the first information includes: first identification information and first encrypted information. The first encrypted information is generated by encrypting the first identification information by use of a private key, and the private key is stored in production equipment of the energy storage battery. The battery swap control unit is further configured to decrypt the first encrypted information by use of a public key corresponding to the private key to generate first decrypted information, where the public key is stored in the battery swap station; and compare the first decrypted information with the first identification information. The determining that the first information passes the authentication includes: determining that the first decrypted information is identical to the first identification information.

In some embodiments, the second information includes: second identification information and second encrypted information. The second encrypted information is generated by encrypting the second identification information by use of a private key, and the private key is stored in production equipment of the shared battery.

In some embodiments, the third information includes: third identification information and third encrypted information. The third encrypted information is generated by encrypting the third identification information by use of a private key, and the private key is stored in production equipment of the battery swap station.

Figure 11:
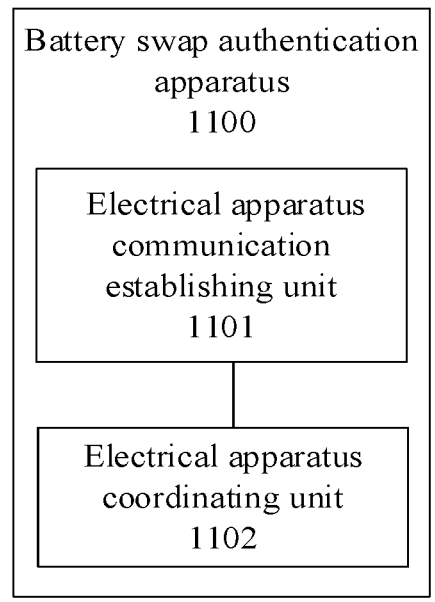
FIG. 11 is a schematic structural diagram of a battery swap authentication apparatus according to other embodiments of this application.

FIG. 11 is a schematic structural diagram of a battery swap authentication apparatus according to other embodiments of this application. Referring to FIG. 11, an embodiment of this application further provides a battery swap authentication apparatus 1100, applied to an electrical apparatus 20. The apparatus 1100 includes: an electrical apparatus communication establishing unit 1101 and an electrical apparatus coordinating unit 1102. The electrical apparatus communication establishing unit 1101 is configured to establish communication with a battery swap station in response to a result of determining that an authentication success message of identity information of the electrical apparatus is received from the battery swap station. The electrical apparatus coordinating unit 1102 is configured to coordinate with the battery swap station to perform a battery swap operation in response to a result of determining that an energy storage battery in the electrical apparatus and/or a shared battery in the battery swap station satisfies a battery swap rule.

In the battery swap authentication apparatus according to this embodiment, before the battery swap operation is performed, whether the energy storage battery in the electrical apparatus 20 and/or the shared battery in the battery swap station 10 satisfies the battery swap rule is verified in addition to authentication of the identity information of the electrical apparatus. That is, a step of authenticating the batteries is added, thereby improving security and reliability of authentication during a battery swap.

In some embodiments, the electrical apparatus coordinating unit is further configured to send first information of the energy storage battery to the battery swap station; and coordinate with the battery swap station to perform the battery swap operation in response to a result of determining that an authentication success message of the first information is received from the battery swap station.

In some embodiments, the electrical apparatus coordinating unit is further configured to authenticate second information in response to a result of determining that the second information of the shared battery is received from the battery swap station; and send an authentication success message of the second information to the battery swap station in response to a result of determining that the second information passes the authentication, and coordinate with the battery swap station to perform the battery swap operation.

In some embodiments, the electrical apparatus coordinating unit is further configured to receive third information of the battery swap station sent by the battery swap station; authenticate the third information; and send the first information of the energy storage battery to the battery swap station in response to a result of determining that the third information passes the authentication.

In some embodiments, the electrical apparatus coordinating unit is further configured to receive second information of the shared battery sent by the battery swap station; authenticate the second information; and send an authentication success message of the second information to the electrical apparatus in response to a result of determining that the second information passes the authentication, and coordinate with the battery swap station to perform the battery swap operation.

In some embodiments, the electrical apparatus coordinating unit is further configured to send first information of the energy storage battery to the battery swap station in response to a result of determining that the second information passes the authentication; and coordinate with the battery swap station to perform the battery swap operation in response to a result of determining that an authentication success message of the first information is received from the battery swap station.

In some embodiments, the electrical apparatus coordinating unit is further configured to receive third information of the battery swap station sent by the battery swap station; authenticate the third information; and send an authentication success message of the third information to the battery swap station in response to a result of determining that the third information passes the authentication, and receive the second information of the shared battery sent by the battery swap station.

In some embodiments, the electrical apparatus communication establishing unit is further configured to establish communication with the battery swap station in response to a result of determining that a communication request sent by the battery swap station by use of a MAC address of the electrical apparatus is received, where the MAC address of the electrical apparatus corresponds to the identity information of the electrical apparatus, and the identity information includes marker information of the electrical apparatus.

In some embodiments, the first information includes: first identification information and first encrypted information. The first encrypted information is generated by encrypting the first identification information by use of a private key, and the private key is stored in production equipment of the energy storage battery.

In some embodiments, the second information includes: second identification information and second encrypted information. The second encrypted information is generated by encrypting the second identification information by use of a private key, and the private key is stored in production equipment of the shared battery. The electrical apparatus coordinating unit is further configured to decrypt the second encrypted information by use of a public key corresponding to the private key to generate second decrypted information, where the public key is stored in the electrical apparatus; and compare the second decrypted information with the second identification information. The determining that the second information passes the authentication includes: determining that the second decrypted information is identical to the second identification information.

In some embodiments, the third information includes: third identification information and third encrypted information. The third encrypted information is generated by encrypting the third identification information by use of a private key, and the private key is stored in production equipment of the battery swap station. The electrical apparatus coordinating unit is further configured to decrypt the third encrypted information by use of a public key corresponding to the private key to generate third decrypted information, where the public key is stored in the electrical apparatus; and compare the third decrypted information with the third identification information. The determining that the third information passes the authentication includes: determining that the third decrypted information is identical to the third identification information.

The function and structure of the battery swap authentication apparatus are the same as those described in the foregoing embodiment, details of which may be learned by referring to the foregoing embodiment.

Figure 12:
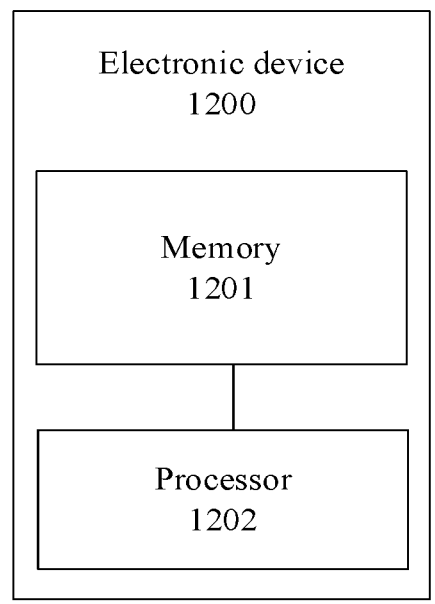
FIG. 12 is a schematic structural diagram of an electronic device according to some embodiments of this application.

FIG. 12 is a schematic structural diagram of an electronic device according to some embodiments of this application. Referring to FIG. 12, an embodiment of this application further provides an electronic device 1200, including: at least one processor 1202; and a memory 1201 connected in communication to the at least one processor 1202. The memory 1201 stores an instruction executable by the at least one processor 1202. The instruction is executed by the at least one processor 1202 so that the at least one processor 1202 is enabled to perform the battery swap authentication method applicable to a battery swap station according to the foregoing embodiments.

In addition, an embodiment of this application further provides a battery swap station, including the electronic device 1200.

An embodiment of this application further provides an electronic device, including: at least one processor; and a memory connected in communication to the at least one processor. The memory stores an instruction executable by the at least one processor. The instruction is executed by the at least one processor so that the at least one processor is enabled to perform the battery swap authentication method applicable to an electrical apparatus according to the foregoing embodiments.

An embodiment of this application further provides an electrical apparatus, including the electronic device described above. For example, the electrical apparatus 20 may be an electric vehicle shown in FIG. 1. The electric vehicle is equipped with an energy storage battery (also referred to as an in-vehicle battery); or, the electrical apparatus 20 may be an energy storage station in which an energy storage battery is deployed.

In some embodiments, the electrical apparatus includes, but is not limited to a vehicle, or the like.

An embodiment of this application further provides a computer-readable storage medium that stores a computer instruction, where the computer instruction is used to enable a computer to perform the battery swap authentication method described above.

An embodiment of this application further provides a computer program product, including a computer program. When executed by a processor, the computer program implements the battery swap authentication method described above.

Finally, it needs to be noted that the foregoing embodiments are merely intended to describe the technical solutions of this application but not to limit this application. Although this application is described in detail with reference to the foregoing embodiments, a person of ordinary skill in the art understands that modifications may still be made to the technical solutions described in the foregoing embodiments, or equivalent replacements may still be made to some or all technical features thereof. The modifications and equivalent replacements, which do not make the essence of the corresponding technical solutions depart from the scope of the technical solutions of the embodiments of this application, fall within the scope of the claims and specification hereof. Particularly, to the extent that no structural conflict exists, various technical features mentioned in various embodiments may be combined in any manner. This application is not limited to the specific embodiments disclosed herein, but includes all technical solutions falling within the scope of the claims.

What is claimed is:

1. A battery swap authentication method, applied to a battery swap station and comprising:
    obtaining identity information of an electrical apparatus;
    authenticating the identity information;
    establishing communication with the electrical apparatus in response to a result of determining that the identity information passes the authentication; and
    performing a battery swap operation in response to a result of determining that at least one of an energy storage battery in the electrical apparatus and a shared battery in the battery swap station satisfies a battery swap rule;

wherein authenticating the identity information of the electrical apparatus comprises:

finding a MAC address of the electrical apparatus based on a correspondence between the identity information and the MAC address, wherein the identity information comprises marker information of the electrical apparatus:

wherein establishing the communication with the electrical apparatus in response to a result of determining that the identity information passes the authentication comprises:

establishing the communication with the electrical apparatus by use of the MAC address of the electrical apparatus in response to a result of determining that the MAC address of the electrical apparatus is found in the correspondence between the identity information and the MAC address.

2. The battery swap authentication method according to claim 1, wherein after the establishing communication with the electrical apparatus, the method further comprises:

receiving first information of the energy storage battery sent by the electrical apparatus; and authenticating the first information;

wherein the performing a battery swap operation in response to a result of determining that at least one of an energy storage battery in the electrical apparatus and a shared battery in the battery swap station satisfies a battery swap rule comprises:

sending an authentication success message of the first information to the electrical apparatus in response to a result of determining that the first information passes the authentication, and performing the battery swap operation.

3. The battery swap authentication method according to claim 2, wherein the sending an authentication success message of the first information to the electrical apparatus in response to a result of determining that the first information passes the authentication, and performing a battery swap operation, comprise:

sending second information of the shared battery to the electrical apparatus in response to a result of determining that the first information passes the authentication; and performing the battery swap operation in response to a result of determining that an authentication success message of the second information is received from the electrical apparatus.

4. The battery swap authentication method according to claim 2, wherein before the receiving first information of the energy storage battery sent by the electrical apparatus, the method further comprises:

sending third information of the battery swap station to the electrical apparatus; and wherein the receiving first information of the energy storage battery sent by the electrical apparatus, and authenticating the first information, comprise:

authenticating the first information in response to a result of determining that the first information of the energy storage battery is received from the electrical apparatus.

5. The battery swap authentication method according to claim 1, wherein after the establishing communication with the electrical apparatus, the method further comprises:

sending second information of the shared battery to the electrical apparatus; and wherein the performing a battery swap operation in response to a result of determining that at least one of an energy storage battery in the electrical apparatus and a shared battery in the battery swap station satisfies a battery swap rule comprises:

performing the battery swap operation in response to a result of determining that an authentication success message of the second information is received from the electrical apparatus.

6. The battery swap authentication method according to claim 5, wherein the performing the battery swap operation in response to a result of determining that an authentication success message of the second information is received from the electrical apparatus comprises:

authenticating first information in response to a result of determining that the first information of the energy storage battery is received from the electrical apparatus; and sending an authentication success message of the first information to the electrical apparatus in response to a result of determining that the first information passes the authentication, and performing the battery swap operation.

7. The battery swap authentication method according to claim 5, wherein, after the establishing communication with the electrical apparatus, the method further comprises:

sending third information of the battery swap station to the electrical apparatus; and sending the second information of the shared battery to the electrical apparatus in response to a result of determining that an authentication success message of the third information is received from the electrical apparatus.

8. The battery swap authentication method according to claim 2, wherein the first information comprises:

first identification information and first encrypted information, the first encrypted information is generated by encrypting the first identification information by use of a private key, and the private key is stored in production equipment of the energy storage battery;

wherein the authenticating the first information comprises:

decrypting the first encrypted information by use of a public key corresponding to the private key to generate first decrypted information, wherein the public key is stored in the battery swap station; and comparing the first decrypted information with the first identification information;

wherein the determining that the first information passes the authentication comprises:

determining that the first decrypted information is identical to the first identification information.

9. The battery swap authentication method according to claim 3, wherein the second information comprises:

second identification information and second encrypted information, the second encrypted information is generated by encrypting the second identification information by use of a private key, and the private key is stored in production equipment of the shared battery.

10. The battery swap authentication method according to claim 4, wherein the third information comprises:

third identification information and third encrypted information, the third encrypted information is generated by encrypting the third identification information by use of a private key, and the private key is stored in production equipment of the battery swap station.

11. A battery swap authentication method, applied to an electrical apparatus and comprising:

establishing communication with a battery swap station in response to a result of determining that an authentication success message of identity information of the electrical apparatus is received from a battery swap station, and coordinating with the battery swap station to perform a battery swap operation in response to a result of determining that at least one of an energy storage battery in the electrical apparatus and a shared battery in the battery swap station satisfies a battery swap rule.

12. The battery swap authentication method according to claim 11, wherein after the establishing communication with a battery swap station, the method further comprises:

sending first information of the energy storage battery to the battery swap station;

wherein the coordinating with the battery swap station to perform a battery swap operation in response to a result of determining that at least one of an energy storage battery in the electrical apparatus and a shared battery in the battery swap station satisfies a battery swap rule comprises:

coordinating with the battery swap station to perform the battery swap operation in response to a result of determining that an authentication success message of the first information is received from the battery swap station.

13. The battery swap authentication method according to claim 12, wherein the coordinating with the battery swap station to perform the battery swap operation in response to a result of determining that an authentication success message of the first information is received from the battery swap station comprises:

authenticating second information in response to a result of determining that the second information of the shared battery is received from the battery swap station; and sending an authentication success message of the second information to the battery swap station in response to a result of determining that the second information passes the authentication, and coordinating with the battery swap station to perform the battery swap operation.

14. The battery swap authentication method according to claim 12, wherein after the establishing communication with a battery swap station, the method further comprises:

receiving third information of the battery swap station sent by the battery swap station;

authenticating the third information; and sending the first information of the energy storage battery to the battery swap station in response to a result of determining that the third information passes the authentication.

15. The battery swap authentication method according to claim 11, wherein after the establishing communication with a battery swap station, the method further comprises:

receiving second information of the shared battery sent by the battery swap station; and authenticating the second information;

wherein the coordinating with the battery swap station to perform a battery swap operation in response to a result of determining that at least one of an energy storage battery in the electrical apparatus and a shared battery in the battery swap station satisfies a battery swap rule comprises:

sending an authentication success message of the second information to the electrical apparatus in response to a result of determining that the second information passes the authentication, and coordinating with the battery swap station to perform the battery swap operation.

16. The battery swap authentication method according to claim 15, wherein the sending an authentication success message of the second information to the electrical apparatus in response to a result of determining that the second information passes the authentication, and coordinating with the battery swap station to perform a battery swap operation, comprise:

sending the first information of the energy storage battery to the battery swap station in response to a result of determining that the second information passes the authentication, and coordinating with the battery swap station to perform the battery swap operation in response to a result of determining that an authentication success message of the first information is received from the battery swap station.

17. The battery swap authentication method according to claim 15, wherein, after the establishing communication with the battery swap station, the method further comprises:

receiving third information of the battery swap station sent by the battery swap station;

authenticating the third information; and sending an authentication success message of the third information to the battery swap station in response to a result of determining that the third information passes the authentication, and receiving the second information of the shared battery sent by the battery swap station.

18. The battery swap authentication method according to claim 11, wherein the establishing communication with a battery swap station in response to a result of determining that an authentication success message of identity information is received from the battery swap station comprises:

establishing communication with the battery swap station in response to a result of determining that a communication request sent by the battery swap station by use of a MAC address of the electrical apparatus is received, wherein the MAC address of the electrical apparatus corresponds to the identity information of the electrical apparatus, and the identity information comprises marker information of the electrical apparatus.

19. An electronic device, comprising:

at least one processor; and a memory connected in communication to the at least one processor, wherein the memory stores an instruction executable by the at least one processor, and the instruction is executed by the at least one processor so that the at least one processor is enabled to perform the method according to claim 1.

* * * * *